US012472615B2

(12) United States Patent
Abbott et al.

(10) Patent No.: US 12,472,615 B2
(45) Date of Patent: Nov. 18, 2025

(54) POWER TOOL CONTROL FOR MULTIPLE FASTENER APPLICATIONS

(71) Applicant: MILWAUKEE ELECTRIC TOOL CORPORATION, Brookfield, WI (US)

(72) Inventors: Jonathan E. Abbott, Milwaukee, WI (US); Timothy R. Obermann, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 207 days.

(21) Appl. No.: 18/557,433

(22) PCT Filed: Apr. 27, 2022

(86) PCT No.: PCT/US2022/026571
§ 371 (c)(1),
(2) Date: Oct. 26, 2023

(87) PCT Pub. No.: WO2022/232297
PCT Pub. Date: Nov. 3, 2022

(65) Prior Publication Data
US 2024/0217082 A1    Jul. 4, 2024

Related U.S. Application Data

(60) Provisional application No. 63/180,473, filed on Apr. 27, 2021.

(51) Int. Cl.
*B25F 5/00* (2006.01)
*B25B 21/02* (2006.01)
*B25B 23/147* (2006.01)

(52) U.S. Cl.
CPC ............... *B25F 5/00* (2013.01); *B25B 21/02* (2013.01); *B25B 23/1475* (2013.01)

(58) Field of Classification Search
CPC ........ B25F 5/00; B25B 21/02; B25B 23/1475
(Continued)

(56) References Cited

U.S. PATENT DOCUMENTS 8,332,932 B2     12/2012  Kellas-Dicks et al.
10,108,169 B2 *  10/2018  Öberg .................... B25B 21/00
(Continued)

FOREIGN PATENT DOCUMENTS

CN     208034590 U     11/2018
CN     109414807 A      3/2019
(Continued)

OTHER PUBLICATIONS

International Search Report and Written Opinion for Application No. PCT/US2022/026571 dated Aug. 23, 2022 (13 pages).
(Continued)

*Primary Examiner* — Dariush Seif
(74) *Attorney, Agent, or Firm* — Michael Best & Friedrich LLP

(57) ABSTRACT

A power tool includes a housing, a motor, a first sensor configured to generate first sensor data related to a movement of the power tool, and a controller. The controller is configured to receive the first sensor data from the first sensor between a first operation and second operation of the power tool, wherein the first sensor data is related to the movement of the power tool, determine a change in position of the power tool based on the first sensor data, determine that the second operation of the power tool is complete based on the change in position of the power tool, and output an indication to a user interface to alert a user that the second operation was completed.

20 Claims, 25 Drawing Sheets

(58) Field of Classification Search
USPC .......................................................... 173/176
See application file for complete search history.

(56) References Cited

U.S. PATENT DOCUMENTS

| | | | | |
|---|---|---|---|---|
| 11,221,611 | B2* | 1/2022 | Abbott | G05B 13/027 |
| 12,153,402 | B2* | 11/2024 | Abbott | B25F 5/00 |
| 2003/0040871 | A1* | 2/2003 | Siegel | B23P 19/06 |
| | | | | 702/33 |
| 2003/0149508 | A1* | 8/2003 | Watanabe | B25B 23/1405 |
| | | | | 73/862.23 |
| 2010/0282482 | A1* | 11/2010 | Austin | G05B 19/41805 |
| | | | | 173/2 |
| 2011/0203821 | A1* | 8/2011 | Puzio | B25F 5/00 |
| | | | | 173/176 |
| 2015/0094836 | A1* | 4/2015 | Rivers | B23Q 17/2233 |
| | | | | 700/160 |
| 2015/0360305 | A1* | 12/2015 | Willgert | B27B 17/0025 |
| | | | | 30/272.1 |
| 2016/0171903 | A1* | 6/2016 | Grossman | G06T 19/006 |
| | | | | 434/238 |
| 2018/0071901 | A1* | 3/2018 | Silha | B25B 21/004 |
| 2018/0154503 | A1* | 6/2018 | Reynertson, Jr. | B25F 1/02 |
| 2019/0091824 | A1 | 3/2019 | Chellew | |
| 2019/0227528 | A1* | 7/2019 | Abbott | G05B 13/027 |
| 2019/0275647 | A1* | 9/2019 | Silha | B25B 23/147 |
| 2021/0154820 | A1* | 5/2021 | Bianco | G01C 19/00 |
| 2021/0252652 | A1* | 8/2021 | Mueckl | B23Q 5/043 |
| 2022/0111496 | A1* | 4/2022 | Beacham, Jr. | B25B 21/008 |
| 2022/0247338 | A1* | 8/2022 | Yoneda | H02P 21/22 |
| 2024/0217082 | A1* | 7/2024 | Abbott | B25B 23/147 |
| 2024/0367303 | A1* | 11/2024 | Davis | B25F 5/00 |
| 2025/0135622 | A1* | 5/2025 | Davis | B25B 23/1425 |

FOREIGN PATENT DOCUMENTS

| | | |
|---|---|---|
| EP | 2722132 A2 | 4/2014 |
| JP | 2015208822 A | 11/2015 |

OTHER PUBLICATIONS

Fan et al., "Improved Pedestrian Dead Reckoning Based on a Robust Adaptive Kalman Filter for Indoor Inertial Location System," Sensors 2019, 19, 294, 21 pages.

Krakiwsky et al., "A Kalman Filter for Integrating Dead Reckoning, Map Matching and GPS Positioning," IEEE Plans '88, Position Location and Navigation Symposium, 1988, pp. 39-46.

* cited by examiner

POWER TOOL CONTROL FOR MULTIPLE FASTENER APPLICATIONS

RELATED APPLICATIONS

This application is a national phase filing under 35 U.S.C. § 371 of International Application No. PCT/US2022/026571, filed Apr. 27, 2022, which claims the benefit of U.S. Provisional Patent Application No. 63/180,473, filed Apr. 27, 2021, the entire content of each of which is hereby incorporated by reference.

FIELD

Embodiments described herein relate to power tools that determine the success of a power tool operation.

SUMMARY

Power tools are used for various fastening and bolting applications. Often these fastening and bolting applications require specific torque, tension, or other seating characteristics to be achieved. The power tools used for fastening and bolting applications include, for example, impact drivers, impact wrenches, drills, powered screw drivers, powered ratchets, powered torque wrenches, hydraulic pulse tools, hydraulic tensioning tools, lock bolt installation tools, reaction arm tools, riveting tools, TC bolt guns, and many others. These fastening and bolting operations may be inspected using, for example, a measuring tool such as a digital torque wrench to confirm that the fastening and bolting operations were appropriately completed.

In the above described fastening and bolting applications, the expectations and targets for a power tool's repeatability and accuracy have narrowed. This has created the need for more complex tool logic to allow these power tools to operate with increasingly higher precision. Currently, power tools only determine the success of a single or individual power tool operation (e.g., per trigger-pull). However, it would be advantageous to determine whether an entire multiple fastener application of a power tool has been successfully completed. For example, for many fastening and bolting applications, it would be advantageous to understand which fastener of a multiple fastener application is currently being engaged. Additionally, power tools would benefit from the ability to apply different control logic for subsequent fastener engagements as knowledge is gained about which fastener is currently being engaged. The power tool acquires, determines, or gains confidence about which fastener of a multiple fastener application is currently being engaged using, for example, dead reckoning, crude logic, and/or machine learning.

Embodiments described herein provide systems and methods for determining the success of a power tool operation done by a power tool. The power tool includes a housing, a motor, a first sensor configured to generate first sensor data related to a movement of the power tool, and a controller. The controller is configured to receive the first sensor data from the first sensor between a first operation and second operation of the power tool, wherein the first sensor data is related to the movement of the power tool, determine a change in position of the power tool based on the first sensor data, determine that the second operation of the power tool is complete based on the change in position of the power tool, and output an indication to a user interface to alert a user that the second operation was completed.

In some aspects, to determine the change in position of the power tool, the controller is configured to integrate the first sensor data.

In some aspects, the first operation is a coupling operation at a first fastener, and the second operation is the coupling operation at a second fastener.

In some aspects, completion of the second operation indicates the completion of a coupling operation.

In some aspects, the power tool further includes a second sensor configured to generate second sensor data indicative of the first operation of the power tool, and wherein the controller is further configured to: receive the second sensor data indicative of beginning the first operation of the power tool.

In some aspects, the first sensor is an accelerometer and the second sensor is a trigger sensor.

In some aspects, the power tool further includes a third sensor configured to generated third sensor data.

In some aspects, the power tool further includes the third sensor is a gyroscope.

In some aspects, the power tool further includes a fourth sensor configured to generate fourth sensor data.

In some aspects, the fourth sensor is a magnetometer.

A further embodiment provides a method of determining that a power tool fastening operation has been completed. The method includes receiving first sensor data from a first sensor between a first operation and a second operation of the power tool, wherein the first sensor data is related to a movement of the power tool, determining a change in position of the power tool based on the first sensor data, determining, based on a characteristic of the change in position, a stored operation profile being performed by the power tool, determining that the power tool fastening operation is complete based on the stored operation profile, and outputting an indication to a user interface to alert a user that the power tool fastening operation was completed.

In some aspects, the stored operation profile corresponds to one of a coupling operation, a lug nut fastening operation, and a flange fastening operation.

In some aspects, the method further includes receiving second sensor data from a second sensor, wherein the second sensor data is indicative of a motor parameter of a motor of the power tool, and controlling the motor based on at least one of the stored operation profile and the second sensor data.

In some aspects, the first operation is spatially different than the second operation.

In some aspects, the first operation is spatially the same as the second operation.

In some aspects, the power tool fastening operation is a first fastening operation, and the method further includes receiving second sensor data from the first sensor between the second operation of the power tool and a third operation of the power tool, determining that the second operation is complete based on the stored operation profile, and outputting a second indication to the user interface to alert the user that the second fastening operation was completed, wherein completion of the second fastening operation indicates completion of the operation profile.

A further embodiment provides a system. The system includes a fastener and a power tool. The power tool includes a housing, a motor supported by the housing, a first sensor configured to generate first sensor data related to a movement of the power tool, and a controller within the housing and connected to the motor. The controller is configured to receive the first sensor data from the first sensor related to the movement of the power tool, determine a change in position of the power tool based the first sensor data, determine that the first operation of the power tool is complete based on at least one of the change in position of the power tool and a stored operation profile, and output an indication to a user interface to alert a user that the first operation was completed.

In some aspects, the controller is further configured to receive second sensor data from a second sensor related to a movement of the fastener, wherein the fastener is provided on a work piece, determine the relative change in position between the power tool and the work piece based on at least one of the first sensor data and the second sensor data, determine that each portion of the stored operation profile is complete based on the relative change in position between the power tool and the work piece, and output an indication to the user interface to alert the user that the stored operation profile was completed.

In some aspects, the first sensor and the second sensor are each accelerometers.

In some aspects, the controller is further configured to control the motor based on the stored operation profile.

Power tools described herein include a housing, a motor supported by the housing, a first sensor configured to generate sensor data related to a movement of the power tool, and a controller within the housing and connected to the motor, the controller configured to receive first sensor data from the first sensor between a first operation and a second operation of the power tool, wherein the first sensor data is related to the movement of the power tool, determine a first change in position of the power tool based on the first sensor data, determine that the second operation of the power tool is complete based on the first change in position of the power tool, receive second sensor data from the first sensor between the second operation of the power tool and a third operation of the power tool, wherein the second sensor data is related to the movement of the power tool, determine a second change in position of the power tool based on the second sensor data, determine that the third operation of the power tool is complete based on the second change in position of the power tool, receive third sensor data from the first sensor between the third operation of the power tool and a fourth operation of the power tool, wherein the third sensor data is related to the movement of the power tool, determine a third change in position of the power tool based on the third sensor data, determine that the fourth operation of the power tool is complete based on the third change in position of the power tool, and output an indication to a user interface to alert a user that the fourth operation was completed.

In some aspects, to determine the change in position of the power tool, the controller is configured to integrate the sensor data.

In some aspects, the controller is further configured to the first operation is a fastening operation at a first lug nut, the second operation is the fastening operation at a second lug nut, the third operation is the fastening operation at a third lug nut, and the fourth operation is the fastening operation at a fourth lug nut.

In some aspects, completion of the fourth operation indicates the completion of a lug nut fastening operation.

In some aspects, the first sensor is an accelerometer.

In some aspects, the controller is further configured to display on the user interface which of the first operation, the second operation, the third operation, and the fourth operation have been completed.

In some aspects, the user interface is provided on the housing of the power tool.

In some aspects, the first operation is a rundown operation at one of a first lug nut and a first flange bolt, the second operation is the rundown operation at one of a second lug nut and a second flange bolt, the third operation is the rundown operation at one of a third lug nut and a third flange bolt, and the fourth operation is the rundown operation at one of a fourth lug nut and a fourth flange bolt.

In some aspects, completion of the fourth operation indicates the completion of the rundown operation.

In some aspects, the controller is further configured to determine one of a lug nut pattern and a flange pattern based on the completion of the rundown operation.

In some aspects, the controller is further configured to: determine that the first, second, third, and fourth lug nuts are in a different position than expected, wherein the lug nut pattern is compared to a stored operation profile to determine that the lug nuts are in a different position than expected, and determine, in response to determining that the first, second, third, and fourth lug nuts are in a different position than expected, that a tire is free spinning.

In some aspects, the controller is further configured to: receive fifth sensor data from the first sensor between the fourth operation and a fifth operation of the power tool, wherein the first sensor data is related to the movement of the power tool, determine a fourth change in position of the power tool based on the fifth sensor data, determine that the fifth operation of the power tool is complete based on the fourth change in position of the power tool, receive sixth sensor data from the first sensor between the fifth operation of the power tool and a sixth operation of the power tool, wherein the sixth sensor data is related to the movement of the power tool, determine a fifth change in position of the power tool based on the sixth sensor data, determine that the sixth operation of the power tool is complete based on the fifth change in position of the power tool, receive seventh sensor data from the first sensor between the sixth operation of the power tool and a seventh operation of the power tool, wherein the seventh sensor data is related to the movement of the power tool, determine a sixth change in position of the power tool based on the seventh sensor data, determine that the seventh operation of the power tool is complete based on the sixth change in position of the power tool, receive eighth sensor data from the first sensor between the seventh operation of the power tool and an eighth operation of the power tool, wherein the eighth sensor data is related to the movement of the power tool, determine a seventh change in position of the power tool based on the eighth sensor data, determine that the eighth operation of the power tool is complete based on the seventh change in position of the power tools, and output an indication to the user interface to alert a user that the eighth operation was completed.

In some aspects, the fifth operation is a tightening operation at one of the first lug nut and the first flange bolt, the sixth operation is the tightening operation at one of the second lug nut and the second flange bolt, the seventh operation is the tightening operation at one of the third lug nut and the third flange bolt, and the eighth operation is the tightening operation at one of the fourth lug nut and the fourth flange bolt.

Methods described herein for determining that a power tool has disengaged from a fastener include receiving first sensor data from a first sensor after a first operation of the power tool, wherein the first sensor data is related to a movement of the power tool, determining a change in position of the power tool based on the first sensor data, and determining that the power tool has disengaged from the fastener based on the change in position of the power tool.

In some aspects, the method further includes determining the change in position of the power tool includes integrating the first sensor data and accounting for gravity.

In some aspects, the method further includes determining that the power tool has disengaged from the fastener includes one of comparing a linear distance that the power tool moves during the change in position to a threshold value and comparing a speed with which the power tool moves during the change in position to a threshold value.

In some aspects, the first sensor is an accelerometer.

In some aspects, the method further includes receiving second sensor data from a second sensor after the power tool has disengaged from the fastener, wherein the second sensor is one of an accelerometer and a timer, processing the first sensor data and the second sensor data using machine learning to produce processed first sensor data and processed second sensor data, and determining that the power tool has disengaged from the fastener based on the processed first sensor data and processed second sensor data.

In some aspects, processing the first sensor data and the second sensor data using machine learning includes determining a first fastening operation that the power tool is being used for.

Systems described herein include a fastener and a power tool. The power tool includes a housing, a motor supported by the housing, a first sensor configured to generate first sensor data related to a movement of the power tool, a second sensor configured to generate second sensor data related to an orientation of the power tool, and a controller within the housing and connected to the motor. The controller is configured to receive the first sensor data from the first sensor related to the movement of the power tool, receive the second sensor data from the second sensor related to the orientation of the power tool, fuse the first sensor data and the second sensor data to create a motion data array, process the motion data array using machine learning to create a processed motion data array, and output an indication to a user interface to alert a user based on the processed motion data array.

In some aspects, the first sensor is an accelerometer and the second sensor is a gyroscope.

In some aspects, processing the motion data array includes integrating the first sensor data.

In some aspects, the indication may include at least one of an estimated displacement of the power tool during a fastening operation, an estimated motion parameter, a confidence classification, a valid transition classification, and a valid pattern classification.

In some aspects, the processed motion data array is a cropped motion data array that excludes first sensor data and second sensor data that corresponds to an obstacle encountered by the power tool.

In some aspects, the controller is further configured to: output the cropped motion data array to the user interface, determine, using machine learning, a change in position of the power tool based on the cropped motion data array, and output an indication based on the determined change in position to the user interface.

Power tools described herein include a housing, a motor supported by the housing, a first sensor configured to generate sensor data related to an operation of the power tool, and a controller within the housing and connected to the motor. The controller is configured to receive first sensor data from the first sensor after a first operation of the power tool, wherein the first operation of the power tool occurs when the power tool is operating, initiate a wait period, wherein the power tool is prohibited from operating during the wait period, end the wait period, and receive second sensor data from the first sensor data, wherein the second sensor data indicates that the power tool is being operated.

In some aspects, the first sensor is coupled to a trigger of the power tool and determines that the trigger is actuated.

In some aspects, the wait period is in the range of 0.1 seconds and 1 second.

In some aspects, the controller is further configured to: determine, using machine learning, a first user wait period specific to a first user, and update, using machine learning, the wait period to be the first user wait period.

In some aspects, the controller is further configured to: create, using machine learning, a time duration array, wherein the time duration array includes times between successive operations of the power tool, process, using machine learning, the time duration array to create a processed time duration array, and determine, using machine learning, that a fastening operation is complete based on the processed time duration array.

In some aspects, the controller is further configured to: determine, using machine learning, that the first operation of the power tool corresponds to the fastening operation at a first fastener based on the processed time duration array, and determine, using machine learning, that a second operation of the power tool corresponds to the fastening operation at a second fastener based on the processed time duration array.

In some aspects, wherein the controller is further configured to: determine, using machine learning, that the first fastener and the second fastener were fastened in a correct order, and classify, using machine learning, the fastening operation as a success based the first fastener and the second fastener being fastened in the correct order.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Embodiments described herein related to multiple fastener operations and techniques for tracking a power tool through multiple fastener applications. For example, the power tool in a multiple fastener operation would be able to determine which fastener is being fastened, how many fasteners have been seated, how many fasteners remain to be seated, whether a fastener was missed, whether a fastener was seated out of order, whether a fastener was over seated, and the like. This information can be used by the power tool to determine whether the multiple fastener operation was successfully completed in a required manner (e.g., all lug nuts on a vehicle tire tightened to specified torque and in proper sequence). Tracking of such multiple fastener applications is achieved using techniques such as dead reckoning (e.g., using existing power tool sensors), crude logic, and/or machine learning. These techniques are also beneficial for single fastener application in which multiple passes or engagements for the single fastener are required (or to prevent multiple engagements).

By enabling a power tool to track multiple fastener applications, several advantages are achieved. In addition to knowing which of the multiple fasteners is being engaged, the power tool could implement different fastening logic (e.g., torque) on different fasteners, account for the fastening effects of one fastener on another fastener, display the status of the multiple fastener operation, identify errors in the multiple fastener operation (e.g., missed fastener), and recognize characteristics of the multiple fastener operation (e.g., number of fasteners, spacing, relative arrangement, etc.). Additionally, the power tool may analyze the information collected during operation to determine characteristics of the operator. For example, characteristics of the operator may include productivity levels, risk levels, fatigue levels, motion patterns of the operator, posture qualities, grip strength, likelihood of side-handle use, operator anomalies, etc.

The above-highlighted techniques and advantages for tracking multiple fastener operations can be implemented in any fastening tool, as well as a variety of other tools where such tracking techniques can be similarly applied.

Figure 1:
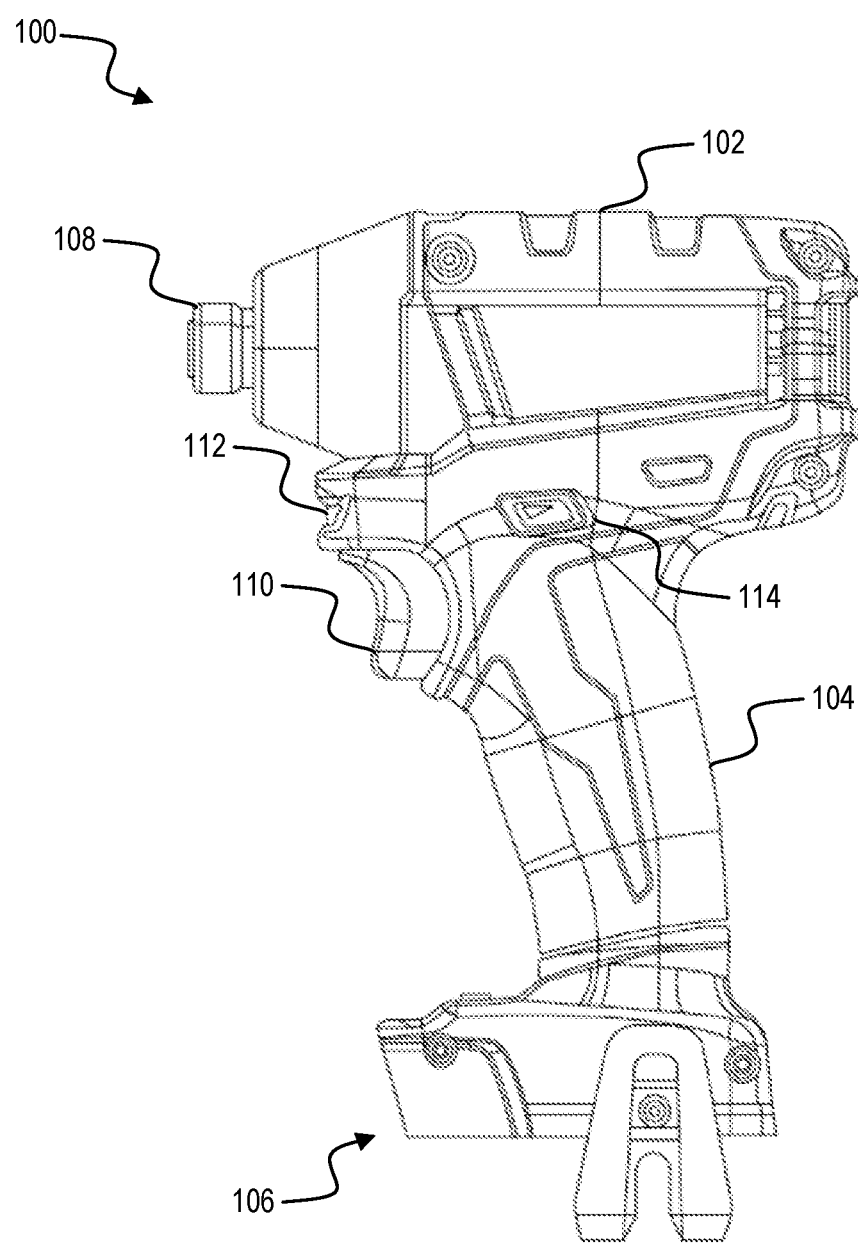
FIG. 1 illustrates a power tool in accordance with embodiments described herein.

FIG. 1 illustrates an embodiment of a power tool 100 for executing and tracking multiple fastener applications. The power tool 100 is configured to perform one or more specific tasks (e.g., drilling, fastening, pressing, impacting, etc.). For example, an impact wrench is associated with the task of generating a rotational output (e.g., to drive a fastener). The task(s) associated with a particular tool may also be referred to as the primary function(s) of the tool. The particular power tool devices 100 illustrated and described herein (e.g., an impact driver) are merely representative. Other embodiments may include a variety of power tools. Power tools can include drills, circular saws, jig saws, band saws, reciprocating saws, screw drivers, angle grinders, straight grinders, hammers, multi-tools, impact wrenches, rotary hammers, impact drivers, angle drills, powered ratchets, powered torque wrenches, hydraulic pulse tools, hydraulic tensioning tools, lock bolt installation tools, reaction arm tools, riveting tools, nailers, staplers, TC bolt guns, and the like.

The power tool 100 illustrated in FIG. 1 is an impact driver. The power tool 100 includes an upper main body 102, a handle 104, a battery pack receiving portion 106, an output drive device or mechanism 108, a trigger 110, a work light 112, and forward/reverse selector 114. The power tool 100 further includes a motor 150 within the main body 102 of the housing and having a rotor and a stator. The rotor is coupled to a motor shaft arranged to produce an output outside of the housing via the output drive device or mechanism. The housing of the power tool 100 (e.g., the main body and the handle) are composed of a durable and light-weight plastic material. The drive device 108 is composed of a metal (e.g., steel) output spindle. The battery pack receiving portion 106 is configured to receive and couple to the battery pack 120 (see FIG. 2) that provides power to the power tool 100. The battery pack receiving portion 106 includes a connecting structure to engage a mechanism that secures the battery pack and a terminal block to electrically connect the battery pack 120 to the power tool 100.

Figure 2:
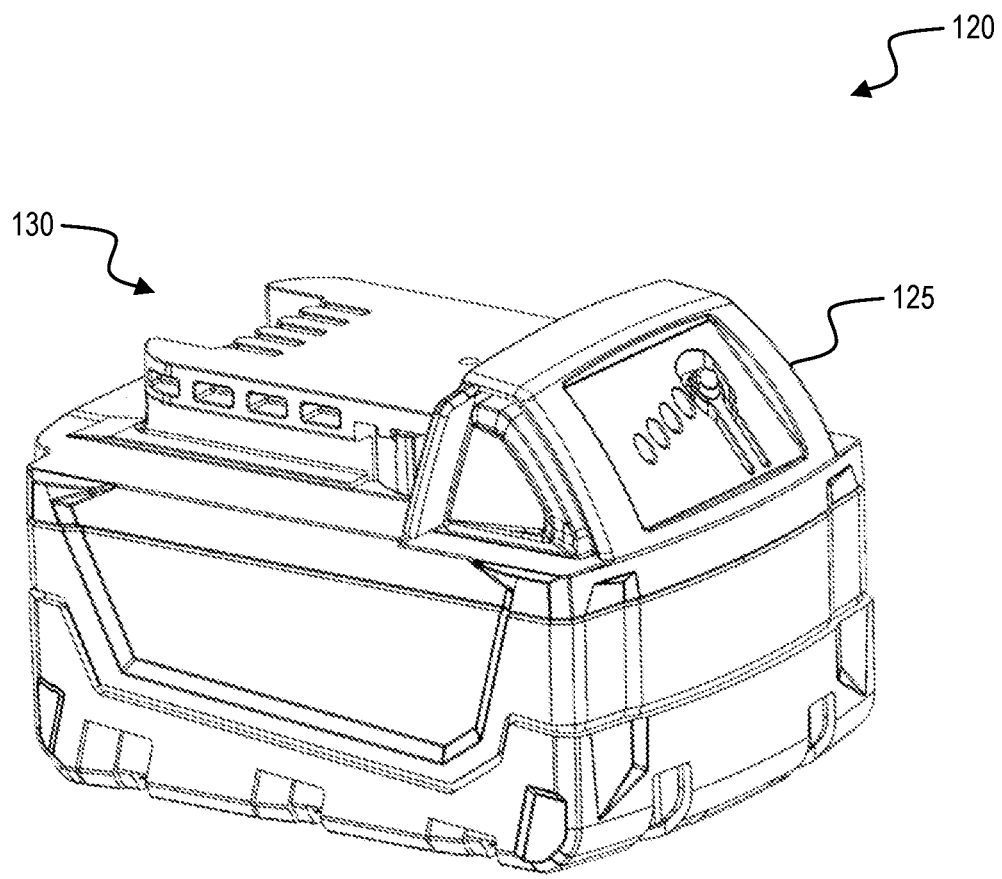
FIG. 2 illustrates a battery pack for powering the power tool of FIG. 1 in accordance with embodiments described herein.

FIG. 2 illustrates a battery pack 120. The battery pack 120 is a power tool battery pack that is generally used to power a power tool, such as power tool 100. The battery pack 120 includes a housing 125 and an interface portion 130 for connecting the battery pack 120 to a device (e.g., the power tool 100). In some embodiments, the battery pack 120 includes lithium ion battery cells. In other embodiments, the battery pack 120 may be of a different chemistry, for example, nickel-cadmium, nickel-metal hydride, and the like. In the illustrated embodiment, the battery pack 120 is an 18 volt battery pack. In other embodiments, the output voltage level of the battery pack 120 may be different. For example, the battery pack 120 can be a 4 volt battery pack, 28 volt battery pack, 40 volt battery pack, or another voltage. The battery pack 120 may also have various capacities (e.g., 3, 4, 5, 6, 8, or 12 ampere-hours).

The battery pack 120 also includes terminals to connect to the power tool 100. The terminals for the battery pack 120 includes a positive and a negative terminal to provide power to and from the battery pack 120. In some embodiments, the battery pack 120 also includes data terminals to communicate with the power tool 100. For example, the battery pack 120 may include a microcontroller to monitor one or more characteristics of the battery pack 120 and the data terminals may communicate with the power tool 100 regarding the monitored characteristics.

Figure 3:
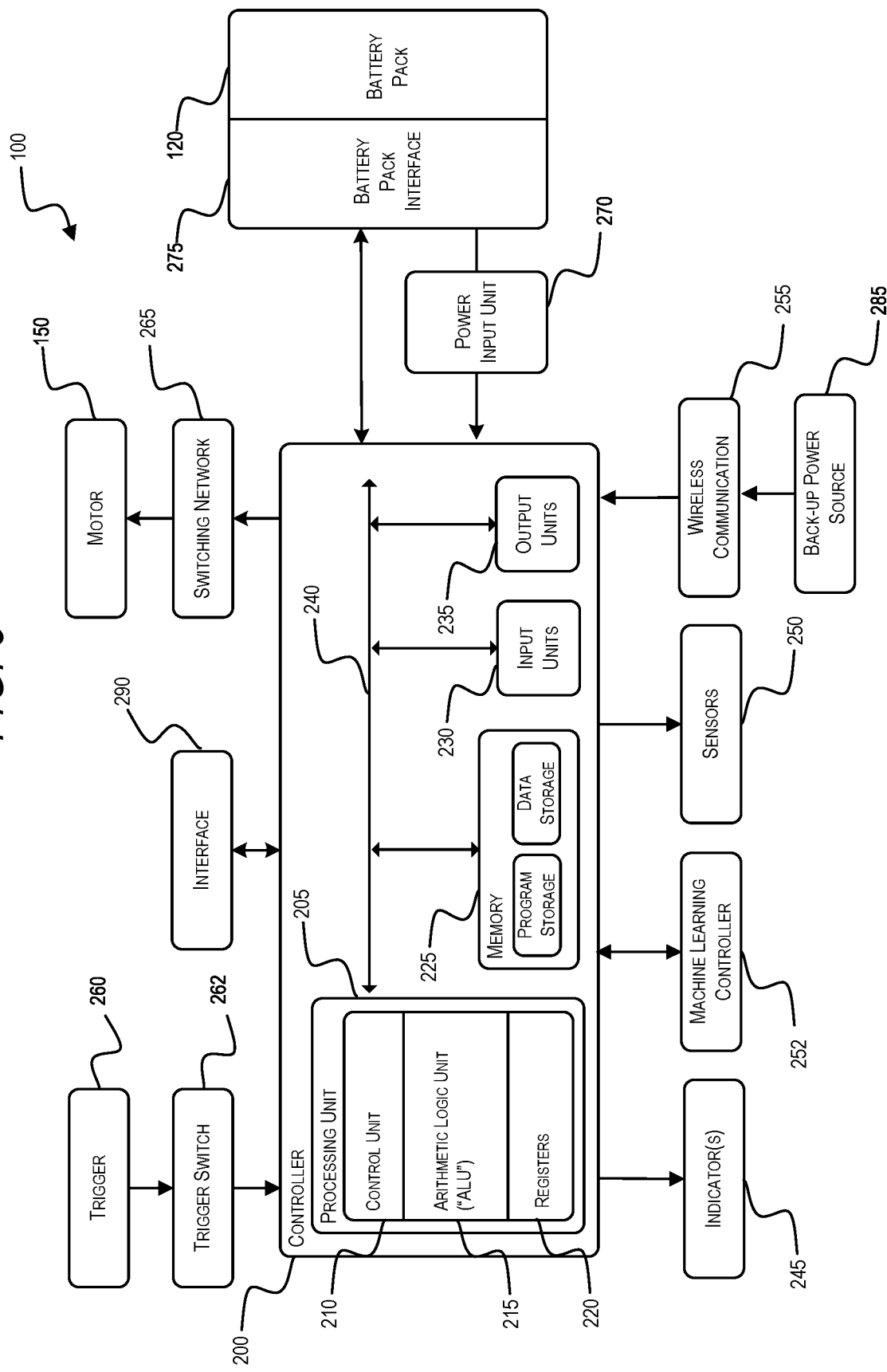
FIG. 3 is a block circuit diagram of the power tool of FIG. 1

A controller 200 for the power tool 100 is illustrated in FIG. 3. The controller 200 is electrically and/or communicatively connected to a variety of modules or components of the power tool 100. For example, the illustrated controller 200 is connected to indicators 245, sensors 250 (which may include, for example, an accelerometer, a gyroscope, a magnetometer, a current sensor, a voltage sensor, a torque sensor, a trigger pull sensor, a temperature sensor, etc.), the machine learning controller 252, a wireless communication controller 255, the trigger 260, a trigger switch 262, a switching network 265, and a power input unit 270.

The controller 200 includes a plurality of electrical and electronic components that provide power, operational control, and protection to the components and modules within the controller 200 and/or power tool 100. For example, the controller 200 includes, among other things, a processing unit 205 (e.g., a microprocessor, an electronic processor, an electronic controller, a microcontroller, or another suitable programmable device), a memory 225, input units 230, and output units 235. The processing unit 205 includes, among other things, a control unit 210, an arithmetic logic unit ("ALU") 215, and a plurality of registers 220 (shown as a group of registers in FIG. 3), and is implemented using a known computer architecture (e.g., a modified Harvard architecture, a von Neumann architecture, etc.). The processing unit 205, the memory 225, the input units 230, and the output units 235, as well as the various modules connected to the controller 200 are connected by one or more control and/or data buses (e.g., common bus 240). The control and/or data buses are shown generally in FIG. 3 for illustrative purposes. The use of one or more control and/or data buses for the interconnection between and communication among the various modules and components would be known to a person skilled in the art in view of the embodiments described herein.

The memory 225 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 205 is connected to the memory 225 and executes software instruction that are capable of being stored in a RAM of the memory 225 (e.g., during execution), a ROM of the memory 225 (e.g., on a generally permanent basis), or another non-transitory computer readable medium such as another memory or a disc. Software included in the implementation of the power tool 100 can be stored in the memory 225 of the controller 200. The software includes, for example, firmware, one or more applications, program data, filters, rules, one or more program modules, and other executable instructions. The controller 200 is configured to retrieve from the memory 225 and execute, among other things, instructions related to the control processes and methods described herein. In other embodiments, the controller 200 includes additional, fewer, or different components.

The motor 150 is energized based on a state of the trigger 260. Generally, when the trigger 260 is activated, the motor 150 is energized, and when the trigger 260 is deactivated, the motor is de-energized. In some embodiments, such as the power tool 100 illustrated in FIG. 1, the trigger 260 extends partially down a length of the handle of the power tool and is moveably coupled to the handle such that the trigger 260 moves with respect to the power tool housing. In the illustrated embodiment, the trigger 260 is coupled to a trigger switch 262 such that when the trigger 260 is depressed, the trigger switch 262 is activated, and when the trigger is released, the trigger switch 262 is deactivated. In the illustrated embodiment, the trigger 260 is biased (e.g., with a biasing member such as a spring) such that the trigger 260 moves in a second direction away from the handle of the power tool 100 when the trigger 260 is released by the user. In other words, the default state of the trigger switch 262 is to be deactivated unless a user presses the trigger 260 and activates the trigger switch 262.

The switching network 265 enables the controller 200 to control the operation of the motor 150. The switching network 265 includes a plurality of electronic switches (e.g., FETs, bipolar transistors, and the like) connected together to form a network that controls the activation of the motor 150 using a pulse-width modulated (PWM) signal. For instance, the switching network 265 may include a six-FET bridge that receives PWM signals from the controller 200 to drive the motor 150. Generally, when the trigger 260 is depressed as indicated by an output of the trigger switch 262, electrical current is supplied from the power input unit 270 to the motor 150 via the switching network 265. When the trigger 260 is not depressed, electrical current is not supplied from the power input unit 270 to the motor 150. As discussed in more detail below, in some embodiments, the amount of trigger pull detected by the trigger switch 262 is related to or corresponds to a desired speed of rotation of the motor 150. In other embodiments, the amount of trigger pull corresponds to a desired torque.

The battery pack interface 275 is connected to the controller 200 and couples to the battery pack 120. The battery pack interface 275 includes a combination of mechanical (e.g., a battery pack receiving portion) and electrical components configured to and operable for interfacing (e.g., mechanically, electrically, and communicatively connecting) the power tool 100 with the battery pack 120. The battery pack interface 275 is coupled to the power input unit 270. The battery pack interface 275 transmits the power received from the battery pack to the power input unit 270. The power input unit 270 includes active and/or passive components (e.g., voltage step-down controllers, voltage converters, rectifiers, filters, etc.) to regulate or control the power received through the battery pack interface 275 and to the wireless communication controller 255 and controller 200. When the battery pack 120 is not coupled to the power tool 100, the wireless communication controller 255 is configured to receive power from a back-up power source 285.

The indicators 245 are also coupled to the controller 200 and receive control signals from the controller 200 to turn on and off or otherwise convey information based on different states of the power tool 100. The indicators 245 include, for example, one or more light-emitting diodes (LEDs), or a display screen (e.g., an LCD display). The indicators 245 can be configured to display conditions of, or information associated with, the power tool 100. For example, the indicators 245 can display information relating to the success or failure of a fastening action performed by the power tool 100. In addition to or in place of visual indicators, the indicators 245 may also include a speaker or a tactile feedback mechanism to convey information to a user through audible or tactile outputs.

The power input unit 270 transmits the power received from the external power source to the controller 200. The controller 200 regulates or controls the power received through the power input unit 270 to the processing unit 205 and other components of the power tool 100.

The sensors 250 are communicatively coupled to the controller 200 and communicate to the controller 200 various output signals indicative of different parameters of the power tool 100 or the motor 150. The sensors 250 include, for example, position or movement sensors such as accelerometers, gyroscopes, magnetometers, inclinometers, Hall Effect sensors, motor current sensors, motor voltage sensors, motor position sensors, temperature sensors, torque sensors, trigger pull sensors, lasers, ultrasonic sensors, and the like. In some embodiments, the sensors 250 may be located in the power tool 100, the battery pack 120, an insertable module (e.g., that inserts into the power tool 100), an attachment to the power tool 100 and/or the battery pack 120 (e.g., an adapter), and/or an accessory worn by an operator (e.g., a smart watch, a glove, etc.).

The controller 200 receives input signals from the trigger pull sensor to sense that the trigger 260 is being actuated and to what extent it is being actuated. For example, the trigger pull sensor senses the amount that the trigger is pulled and the force with which the trigger is pulled. The controller 200 also receives inputs from the motor current sensors, motor voltage sensors, and torque sensors to determine how the motor 150 is being operated and for what application. For example, the motor current sensors, motor voltage sensors, and torque sensors monitor parameters of the motor 150 to determine how long the motor 150 has been operated, at what speed, and under what load.

The accelerometer senses acceleration of the power tool 100 in an inertial frame, which may include acceleration due to gravity. The starting orientation of the power tool 100 can be determined once the power tool 100 has been picked up but is no longer moving. When the power tool 100 is no longer moving, the accelerometer determines that the power tool 100 is not accelerating and that the power tool 100 is pointed in the direction of gravity, thus determining the orientation of the power tool 100 with respect to the ground. Over time, the accelerometer can give information to the controller 200 about the velocity and position of the power tool 100.

In some embodiments, the starting orientation of the power tool 100 is recorded at the start of an operation. In such embodiments, the starting orientation of the power tool is not reset with each pull of the trigger 260. For example, if a user actuates the trigger 260 and then releases the trigger, the power tool 100 determines the orientation at that point as part of the operation and does not restart a relative position and or orientation calculation. Once the power tool 100 is moved, such that the accelerometer determines a change in acceleration, the accelerometer data can be integrated twice to determine the position of the power tool 100, and the position can be tracked throughout the course of the operation.

The gyroscope determines the spatial orientation of the power tool 100 and the rotation with which the power tool 100 is being held during an operation. The gyroscope continually senses the spatial orientation of the power tool 100. For example, the gyroscope senses the angular velocities of the power tool and can determine angular displacements of the power tool 100 in three dimensions. The gyroscope may determine that a user has rotated the tool during operation. The magnetometer can be used to compensate for drift and/or integration errors in the other sensors. For example, errors may arise during the double integration of the data from the accelerometer. Errors may also arise from the gyroscope changing directions and from improperly subtracting gravity if the direction of gravity is not perfectly ascertained.

Additionally or alternatively, in some embodiments, two or more accelerometers may be positioned in different locations in the power tool 100 and/or the battery pack 120 to determine the rotation of the power tool 100. The use of two accelerometers to determine rotation may compensate for any errors that could arise from the effects of gravity.

The controller 200 uses the various sensor inputs to determine and track the operation of the power tool 100. As discussed in detail below with respect to FIG. 13, the controller 200 also receives inputs from the motor current sensors, motor voltage sensors, and torque sensors to determine how the power tool 100, and in particular the motor 150, is operated and moved during an operation. The controller 200 also receives inputs from the accelerometer, the gyroscope, and the magnetometer and fuses the angle of movement input and the directional input with the starting position input to determine overall movement of the power tool 100 with respect to the starting position. In some embodiments, the sensors may be incorporated into a single sensor chip. For example, the accelerometer and the gyroscope may be incorporated into a single sensor chip. Alternatively, or additionally, the accelerometer, the gyroscope, and the magnetometer may be incorporated into a single sensor chip. In some embodiments, the accelerometer, the gyroscope, and the magnetometer may be incorporated into separate sensor chips.

In some embodiments, the controller 200 may be located external to the power tool 100. For example, the controller 200 may be located in the battery pack 120, a power tool adapter, an insertable module, another power tool, and/or a wearable device worn by the user. In some embodiments, at least one of the sensors 250 may be located external to the power tool 100. For example, the sensor may be a motion sensor and may be located in the battery pack 120, a power tool adapter, an insertable module, another power tool, and/or a wearable device worn by the user.

Figure 4:
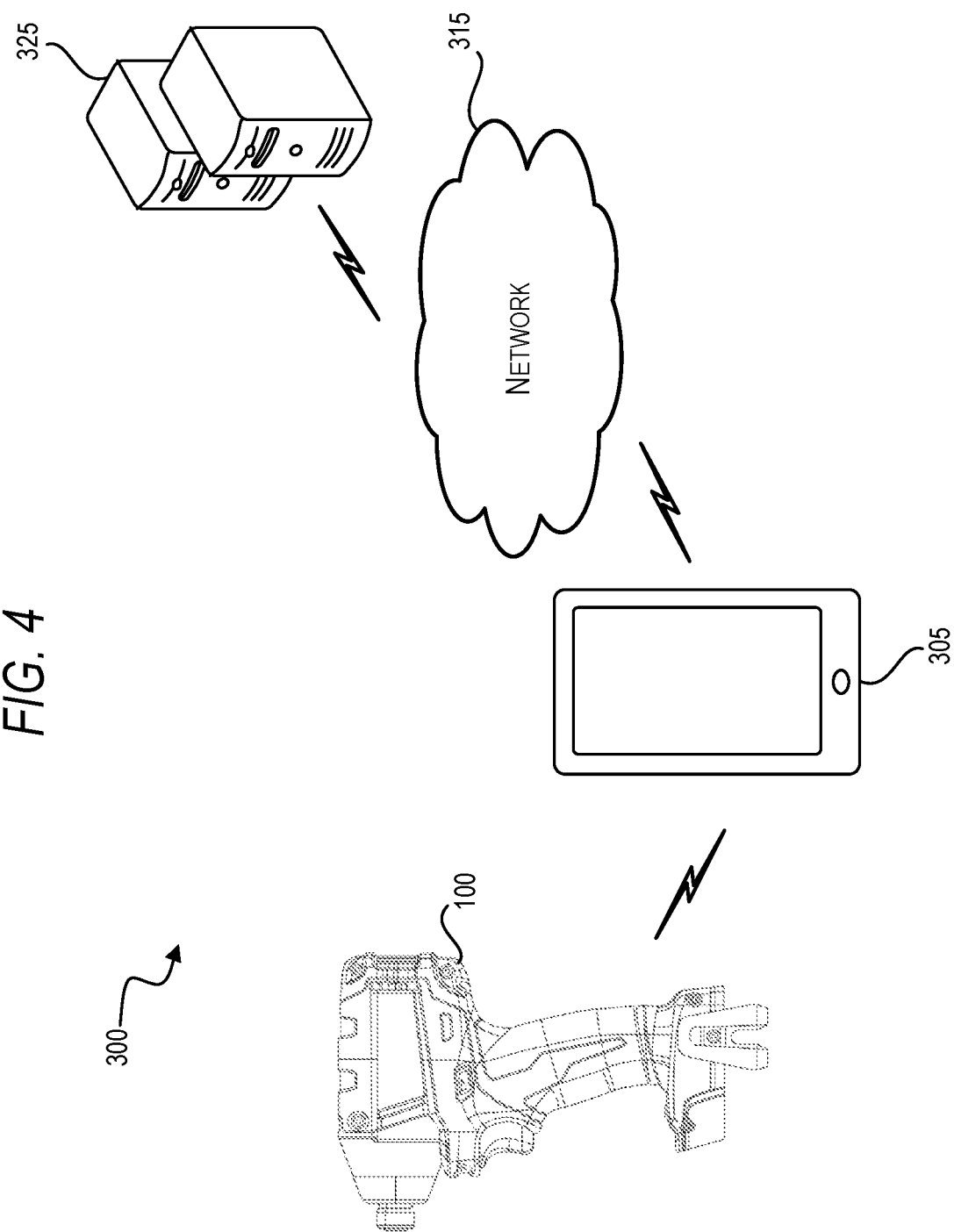
FIG. 4 is a communication network for the power tool of FIG. 1 and external devices in accordance with embodiments described herein.

As shown in FIG. 4, in some embodiments, the power tool 100 communicates with an external device 305 and a server 325. The external device 305 may bridge communication between the power tool 100 and the server 325. That is, the power tool 100 may communicate directly with the external device 305. The external device 305 may then forward the information received from the power tool 100 to the server 325. Similarly, the server 325 may transmit information to the external device 305 to be forwarded to the power tool 100.

In such embodiments, the power tool 100 may include, for example, the wireless communication controller 255 described below which includes a transceiver to communicate with the external device 305 via, for example, a short-range communication protocol, such as BLUETOOTH®. The external device 305 may include a short-range transceiver to communicate with the power tool 100, and may also include a long-range transceiver to communicate with the server 325. In some embodiments, a wired connection (via, for example, a USB cable) is provided between the external device 305 and the power tool 100 to enable direct communication between the external device 305 and the power tool 100. Providing the wired connection may provide a faster and more reliable communication method between the external device 305 and the power tool 100.

The external device 305 may include, for example, a smart telephone, a tablet computer, a cellular phone, a laptop computer, a smart watch, and the like. The server 325 illustrated in FIG. 4 includes at least a server electronic processor, a server memory, and a transceiver to communicate with the power tool 100 via the network 315. A server electronic processor receives tool usage data from the power tool 100, stores the tool usage data in the server memory, and, in some embodiments, uses the received tool usage data for building or adjusting the machine learning controller 252.

In some embodiments, the work piece or object that the power tool 100 is being operated on may be moving, such as during assembly or prefabrication environments. For example, the power tool 100 may be used on a conveyor belt system such that the object being operated on is experiencing one-directional movement at either a constant speed or variable speeds. As another example, the power tool 100 may be used on a car jack system such that the object (e.g., a tire) being operated on experiences elevation changes. Accordingly, in this embodiment, sensor data associated with the motion and/or position of the object being operated on may be transmitted to the power tool 100. The power tool 100 may include the sensor data to determine and track the movement of the power tool 100.

The external device 305 may communicate with the power tool 100 to generate a graphical user interface to facilitate the adjustment of operational parameters of the power tool 100. The external device 305 may also bridge the communication between the power tool 100 and the server 325. For example, as described below with respect to FIG. 6, in some embodiments, the external device 305 receives a selection of a target task for the machine learning controller 252. The external device 305 may then request a corresponding machine learning program from the server 325 for transmitting to the power tool 100. The power tool 100 also communicates with the server 325 (e.g., via the external device 305). In some embodiments, the server 325 may also re-train the self-updating machine learning controller 252, for example, as described below. The server 325 may use additional training examples from other similar power tools. Using these additional training examples may provide greater variability and ultimately make the machine learning controller 252 more reliable. In some embodiments, the power tool 100 re-trains the self-updating machine learning controller 252 when the power tool 100 is not in operation, and the server 325 may re-train the machine learning controller 252 when the power tool 100 remains in operation (for example, while the power tool 100 is in operation during a scheduled re-training of the machine learning controller 252). Accordingly, in some embodiments, the self-updating machine learning controller 252 may be re-trained on the power tool 100, by the server 325, or with a combination thereof. In some embodiments, the server 325 does not re-train the self-updating machine learning controller 252, but still exchanges information with the power tool 100. For example, the server 325 may provide other functionality for the power tool 100 such as, for example, transmitting information regarding various operating modes for the power tool 100.

In some embodiments, the power tool 100 may not communicate with the external device 305 or the server 325. For example, the power tool 100 may have no connection to the external device 305 or the server 325. Rather, since the power tool 100 includes the self-updating machine learning controller 252, the power tool 100 can implement the machine learning controller 252, receive user feedback, and update the machine learning controller 252 without communicating with the external device 305 or the server 325.

Figure 5:
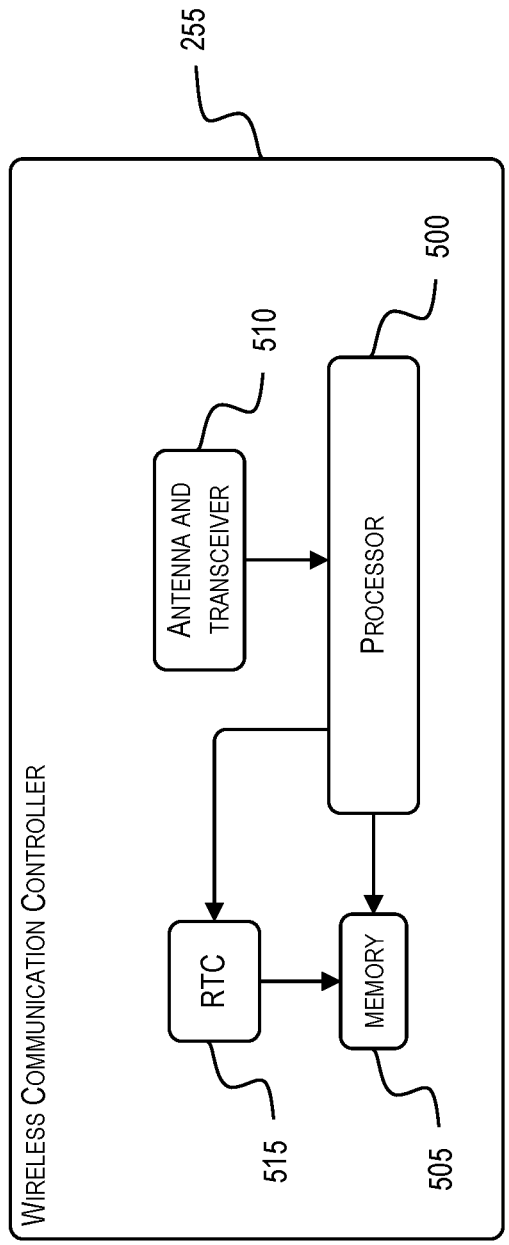
FIG. 5 is a block diagram of a wireless communication controller of the power tool of FIG. 1

As shown in FIG. 5, the wireless communication controller 255 includes a processor 500, a memory 505, an antenna and transceiver 510, and a real-time clock (RTC) 515. The wireless communication controller 255 enables the power tool 100 to communicate with the external device 305 (see, e.g., FIG. 4). The radio antenna and transceiver 510 operate together to send and receive wireless messages to and from the external device 305 and the processor 500. The memory 505 can store instructions to be implemented by the processor 500 and/or may store data related to communications between the power tool 100 and the external device 305, or the like. The processor 500 for the wireless communication controller 255 controls wireless communications between the power tool 100 and the external device 305. For example, the processor 500 associated with the wireless communication controller 255 buffers incoming and/or outgoing data, communicates with the controller 200, and determines the communication protocol and/or settings to use in wireless communications. The communication via the wireless communication controller 255 can be encrypted to protect the data exchanged between the power tool 100 and the external device 305 from third parties.

In the illustrated embodiment, the wireless communication controller 255 is a Bluetooth® controller. The Bluetooth® controller communicates with the external device 305 employing the Bluetooth® protocol. Therefore, in the illustrated embodiment, the external device 305 and the power tool 100 are within a communication range (i.e., in proximity) of each other while they exchange data. In other embodiments, the wireless communication controller 255 communicates using other protocols (e.g., Wi-Fi, ZigBee, a proprietary protocol, etc.) over different types of wireless networks. For example, the wireless communication controller 255 may be configured to communicate via Wi-Fi through a wide area network such as the Internet or a local area network, or to communicate through a piconet (e.g., using infrared or NFC communications).

In some embodiments, the network is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, 5G New Radio, a Digital Enhanced Cordless Telecommunications ("DECT") network, a Digital AMPS ("IS-136/TDMA") network, or an Integrated Digital Enhanced Network ("iDEN") network, etc.

The wireless communication controller 255 is configured to receive data from the controller 200 and relay the information to the external device 305 via the antenna and transceiver 510. In a similar manner, the wireless communication controller 255 is configured to receive information from the external device 305 via the antenna and transceiver 510 and relay the information to the controller 200. For example, the information may be configuration and programming information such as enabling, disabling, or adjusting the verification and/or sensitivity of tracking motion during fastening applications.

The RTC 515 increments and keeps time independently of the other power tool components. The RTC 515 receives power from the battery pack 120 when the battery pack 120 is connected to the power tool 100 and receives power from the back-up power source 285 when the battery pack is not connected to the power tool 100. Having the RTC 515 as an independently powered clock enables time stamping of operational data (stored in memory 225 for later export) and a security feature whereby a lockout time is set by a user (e.g., via the external device 305) and the tool is locked-out when the time of the RTC 515 exceeds the set lockout time.

Figure 6:
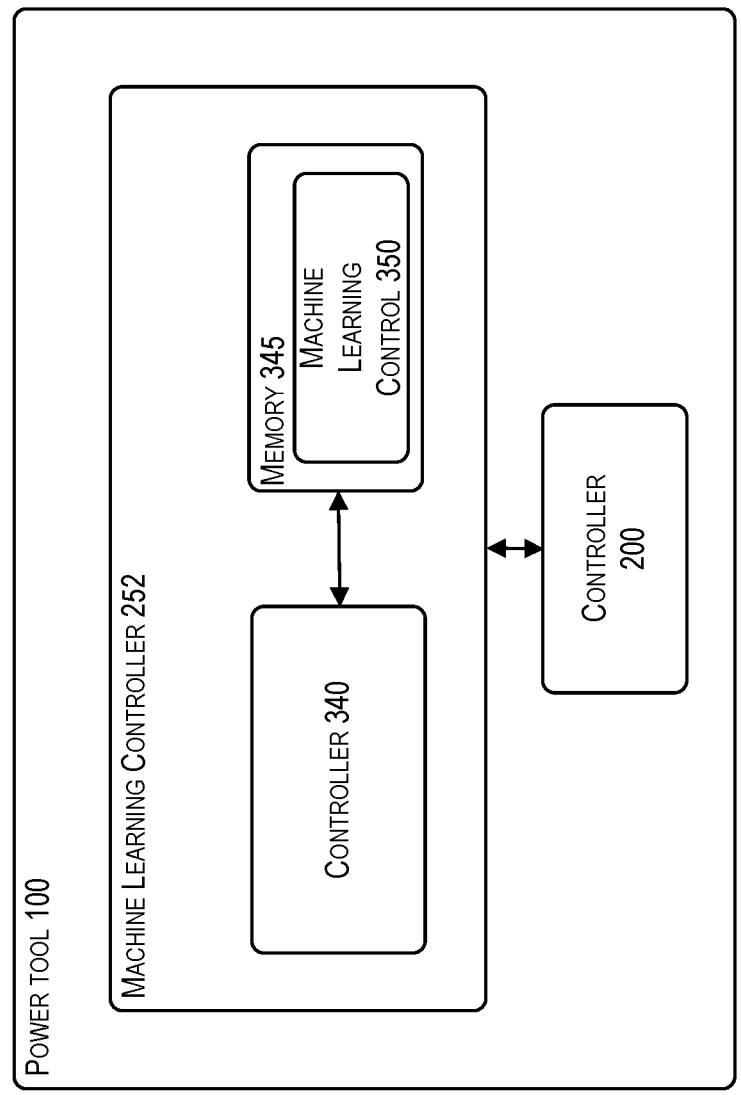
FIG. 6 is a block diagram of a machine learning controller of the power tool of FIG. 1.

FIG. 6 is a block diagram of a representative power tool 100 in the form of, for example, an impact driver, including the machine learning controller 252. In other embodiments, the power tool 100 does not include the machine learning controller 252. Rather, the multiple fastening operations are tracked and monitored using the power tool sensors 250 and dead reckoning techniques and/or crude logic. The machine learning controller 252 of the power tool 100 may be a self-updating machine learning controller, a static machine learning controller programmed via a server, or an adjustable machine learning controller. Although the power tool 100 of FIG. 1 may be in communication with the external device 305 or with a server 325, as described above with respect to FIG. 4, in some embodiments, the power tool 100 is self-contained or closed, in terms of machine learning, and does not need to communicate with the external device 305 or the server 325 to perform the functionality of the machine learning controller 252, described in more detail below.

The self-updating machine learning controller 252 is first loaded on the power tool 100 during, for example, manufacturing. The self-updating machine learning controller 252 updates itself. In other words, the self-updating machine learning controller 252 receives new usage information from the sensors in the power tool 405, feedback information indicating desired changes to operational parameters (e.g., user wants to increase motor speed or output torque), feedback information indicating whether the classification made by the machine learning controller 252 is incorrect, or a combination thereof. The self-updating machine learning controller 252 then uses the received information to re-train the self-updating machine learning controller 252. In some embodiments, the self-updating machine learning controller 252 may receive new usage information from the sensors that indicates an adjustment to a threshold for determining that a fastener has been engaged or disengaged and/or an adjustment to the threshold for determined motion between fasteners. Customizable thresholds minimize false alerts by the power tool 100 since different users may use the power tool 100 in different manners.

In some embodiments, the power tool 100 re-trains the self-updating machine learning controller 252 when the power tool 100 is not in operation. For example, the power tool 100 may detect when the motor has not been operated for a predetermined time period, and start a re-training process of the self-updating machine learning controller 252 while the power tool 100 remains non-operational. Training the self-updating machine learning controller 252 while the power tool 100 is not operating allows more processing power to be used in the re-training process instead of competing for computing resources typically used to operate the power tool 100.

As shown in FIG. 6, the machine learning controller 252 includes a controller 340 and a memory 345. The memory 345 stores a machine learning control 350. The machine learning control 350 may include a self-adjusting machine learning program, as described above. In the illustrated embodiment, the controller 340 includes a graphics processing unit. In the embodiment of FIG. 6, the machine learning controller 252 is positioned on a separate printed circuit board (PCB) as the controller 200 of the power tool 100. The PCB of the controller 200 and the machine learning controller 252 are coupled with, for example, wires or cables to enable the controller 200 of the power tool 100 to control the motor 150 based on the outputs and determinations from the machine learning controller 252. In other embodiments, however, the machine learning control 350 may be stored in memory 225 of the controller 200 and may be implemented by the processing unit 205. In yet other embodiments, the machine learning controller 252 is implemented in an electronic control assembly, but is positioned on the same PCB as the controller 200 of the power tool 100. In some embodiments the external device 305 includes the machine learning controller 252 and the power tool 100 communicates with the external device 305 to receive the estimations or classifications from the machine learning controller 252. In some embodiments, the machine learning controller 252 is implemented in a plug-in chip or controller that is added to the power tool 100. For example, the machine learning controller 252 may include a plug-in chip that is received within a cavity of the power tool 100 and connects to the controller 200. For example, in some embodiments, the power tool 100 includes a lockable compartment including electrical contacts that are configured to receive and electrically connect to the plug-in machine learning controller 252. The electrical contacts enable bidirectional communication between the plug-in machine learning controller 252 and the controller 200 and enable the plug-in machine learning controller 252 to receive power from the power tool 100.

The machine learning control 350 may be built and operated by the server 325. In other embodiments, the machine learning control 350 may be built by the server 325, but implemented by the power tool 100, and in yet other embodiments, the power tool 100 (e.g., controller 200) builds and implements the machine learning control 350.

Figure 7:
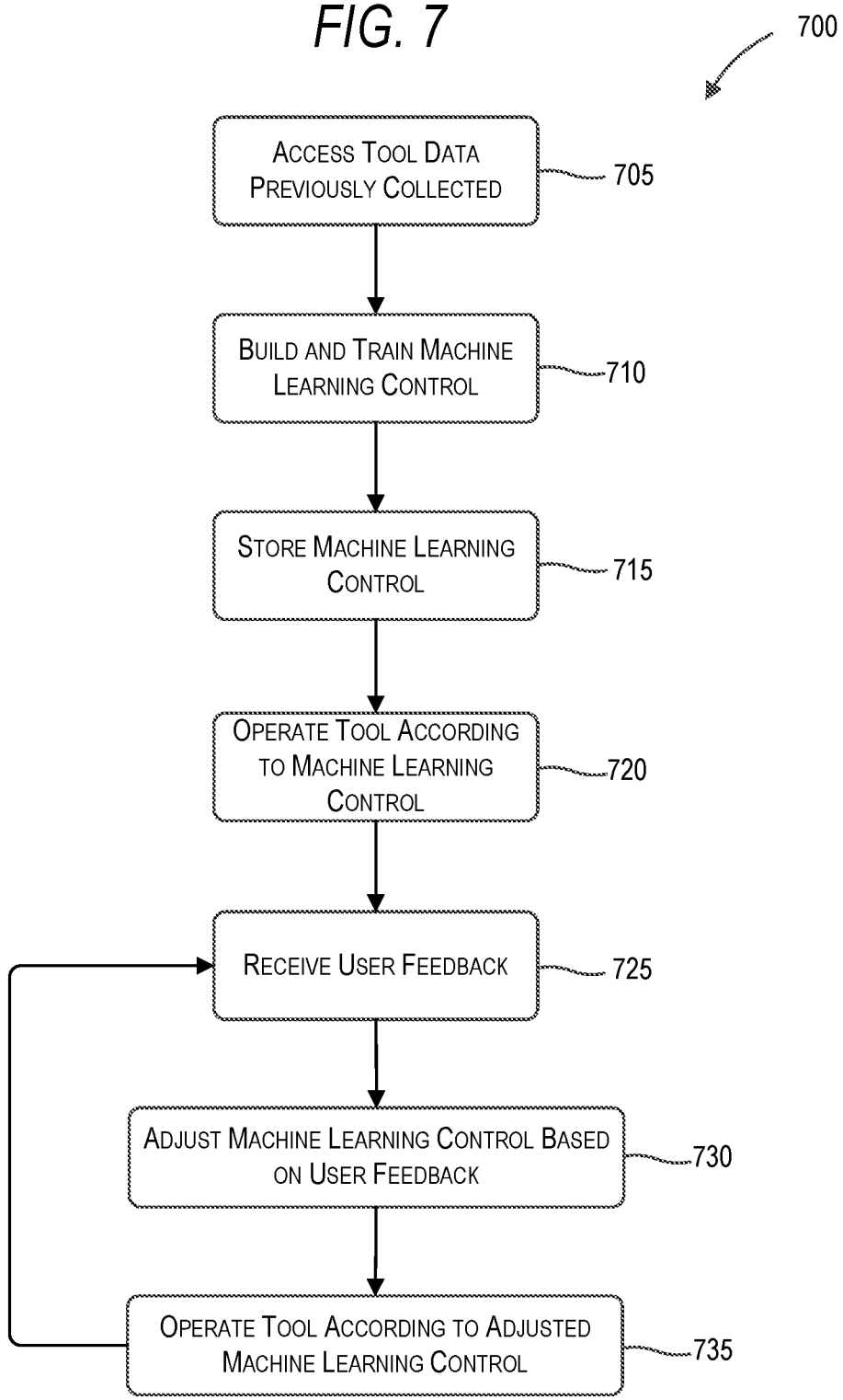
FIG. 7 is a flowchart illustrating a method of building and implementing a machine learning controller for the power tool of FIG. 1.

FIG. 7 illustrates a method 700 of building and implementing the machine learning control 350. The method 700 is described with respect to power tool 100. In step 705, the server electronic processor accesses tool usage information previously collected from similar power tools. For example, to build the machine learning control 350 for the power tool 100, the server electronic processor accesses tool usage data previously collected from other impact drivers (e.g., via the network 315). The tool usage data includes, for example, motor current, motor voltage, motor position and/or velocity, usage time, battery state of charge, position of the power tool, position or velocity of the output shaft, number of impacts, and the like. The server electronic processor then proceeds to build and train the machine learning control 350 (step 710).

Building and training the machine learning control 350 may include, for example, determining the machine learning architecture (e.g., using a support vector machine, a decision tree, a neural network, or a different architecture). In the case of building and training a neural network, for example, building the neural network may also include determining the number of input nodes, the number of hidden layers, the activation function for each node, the number of nodes of each hidden layer, the number of output nodes, and the like. Training the machine learning control 350 includes providing training examples to the machine learning control 350 and using one or more algorithms to set the various weights, margins, or other parameters of the machine learning control 350 to make reliable estimations or classifications.

In some embodiments, building and training the machine learning control 350 includes building and training a recurrent neural network. Recurrent neural networks allow analysis of sequences of inputs instead of treating every input individually. That is, recurrent neural networks can base their determination or output for a given input not only on the information for that particular input, but also on the previous inputs. For example, when the machine learning control 350 is configured to identify a type of fastener used with the power tool 100, the machine learning control 350 may determine that since the last three operations used lug nuts, the fourth operation is also likely to use a lug nut. Using recurrent neural networks helps compensate for some of the misclassifications the machine learning control 350 would make by providing and taking account the context around a particular operation. Accordingly, when implementing a recurrent neural network, the learning rate affects not only how each training example affects the overall recurrent neural network (e.g., adjusting weights, biases, and the like), but also affects how each input affects the output of the next input.

The server electronic processor, the controller 340, or the controller 200 builds and trains the machine learning control 350 to perform a particular task. For example, in some embodiments, the machine learning control 350 is trained to identify an application for which the power tool 100 is used (e.g., for installing multiple fasteners). In other embodiments, the machine learning control 350 is trained to detect when a detrimental condition is present or eminent (e.g., detecting kickback). The task for which the machine learning control 350 is trained may vary based on, for example, the type of power tool 100, a selection from a user, typical applications for which the power tool is used, and the like. The server electronic processor uses different tool usage data and sensor input to train the machine learning control 350 based on the particular task. In some embodiments, the machine learning controller 350 may be a pretrained model that was trained for a first application. The controller 340, or the controller 200, may retrain the machine learning control 350 for a second application, different from the first application. In some embodiments, the second application may be a more focused application of the first application.

In some embodiments, the particular task for the machine learning controller 252 (e.g., for the machine learning control 350) also defines the particular architecture for the machine learning control 350. For example, for a first set of tasks, the server electronic processor may build a support vector machine, while, for a second set of tasks, the server electronic processor may build a neural network. In some embodiments, each task or type of task is associated with a particular architecture. In such embodiments, the server electronic processor determines the architecture for the machine learning control 350 based on the task and the machine learning architecture associated with the particular task.

After the server electronic processor, the controller 340, or the controller 200 builds and trains the machine learning control 350, the server electronic processor stores the machine learning control 350 in, for example, the memory of the server 325 (step 715). The server electronic processor, additionally or alternatively, transmits the trained machine learning control 350 to the power tool 100. In such embodiments, the power tool 100 stores the machine learning control 350 in the memory 345 of the machine learning controller 252. In some embodiments, for example, when the machine learning control 350 is implemented by the controller 200 of the power tool 100, the power tool 100 stores the machine learning control 350 in the memory 225 of the controller 200.

Once the machine learning control 350 is stored, the power tool 100 operates the motor 150 according to (or based on) the outputs and determinations from the machine learning controller 252 (step 720). In embodiments in which the machine learning controller 252 (including the machine learning control 350) is implemented in the server 325, the server 325 may determine operational thresholds from the outputs and determinations from the machine learning controller 252. The server 325 then transmits the determined operational thresholds to the power tool 100 to control the motor 150.

The performance of the machine learning controller 252 depends on the amount and quality of the data used to train the machine learning controller 252. Accordingly, if insufficient data is used (e.g., by the server 325) to train the machine learning controller 252, the performance of the machine learning controller 252 may be reduced. Alternatively, different users may have different preferences and may operate the power tool 100 for different applications and in a slightly different manner (e.g., some users may press the power tool 100 against the work surface with a greater force, some may prefer a faster finishing speed, and the like). These differences in usage of the power tool 100 may also compromise some of the performance of the machine learning controller 252 from the perspective of a user.

Optionally, to improve the performance of the machine learning controller 252, in some embodiments, the server electronic processor receives feedback from the power tool 100 (or the external device 305) regarding the performance of the machine learning controller 252 (step 725). In other embodiments, however, the power tool 100 does not receive user feedback regarding the performance of the machine learning controller 252 and instead continues to operate the power tool 100 by executing the machine learning control 350. As explained in further detail below, in some embodiments, the power tool 100 includes specific feedback mechanism for providing feedback on the performance of the machine learning controller 252. In some embodiments, the external device 305 may also provide a graphical user interface that receives feedback from a user regarding the operation of the machine learning controller 252. The external device 305 then transmits the feedback indications to the server electronic processor. In some embodiments, the power tool 100 may only provide negative feedback to the server 325 (e.g., when the machine learning controller 252 performs poorly). In some embodiments, the server 325 may consider the lack of feedback from the power tool 100 (or the external device 305) to be positive feedback indicating an adequate performance of the machine learning controller 252. In some embodiments, the power tool 100 receives, and provides to the server electronic processor, both positive and negative feedback. As discussed above, in some embodiments, the power tool 100 may send the feedback or other information directly to the server 325 while in other embodiments, an external device 305 may serve as a bridge for communications between the power tool 100 and the server 325 and may send the feedback to the server 325. In some embodiments, the power tool 100 may ask a user for confirmation, via the user interface and/or the external device 305, that the power tool 100 was moved correctly from one fastener to the next fastener, thus gathering feedback. The feedback may be sent to the server 325 directly from the power tool 100 or from the external device 305. The feedback may indicate to the controller 200 that the fastening application is completed.

The server electronic processor then adjusts the machine learning control 350 based on the received user feedback (step 730). In some embodiments, the server electronic processor adjusts the machine learning control 350 after receiving a predetermined number of feedback indications (e.g., after receiving feedback indications). In other embodiments, the server electronic processor adjusts the machine learning control 350 after a predetermined period of time has elapsed (e.g., every two months). In some embodiments, the server electronic processor adjusts the machine learning control 350 continuously (e.g., after receiving each feedback indication). Adjusting the machine learning control 350 may include, for example, retraining the machine learning controller 252 using the additional feedback as a new set of training data or adjusting some of the parameters (e.g., weights, support vectors, and the like) of the machine learning controller 252. Because the machine learning controller 252 has already been trained for the particular task, re-training the machine learning controller 252 with the smaller set of newer data requires fewer computing resources (e.g., time, memory, computing power, etc.) than the original training of the machine learning controller 252.

After the server electronic processor, the controller 340, or the controller 200 adjusts the machine learning controller 252 based on the user feedback, the power tool 100 operates according to the outputs and determinations from the adjusted machine learning controller 252 (step 735). In some embodiments the server 325 transmits the adjusted machine learning control 350 to the power tool 100. The power tool 100 then stores the adjusted machine learning control 350 in the memory 345 of the machine learning controller 252 (or in the memory 225 of the power tool 100), and operates the motor 150 according to the adjusted machine learning controller 252. The adjusted machine learning controller 252 improves its performance by using a larger and more varied dataset (e.g., by receiving feedback indications from various users) for the training of the machine learning controller 252.

The description of FIG. 7 focuses on the server electronic processor training, storing, and adjusting the machine learning control 350. In some embodiments, however, the controller 200 of the power tool 100 may perform some or all of the steps described above with respect to FIG. 7. For example, FIG. 4 illustrates an example power tool system 300 in which the power tool 100 may store and adjust the machine learning controller 252. Accordingly, in this system 300, controller 200 performs some or all of the steps described above with respect to FIG. 7. Analogously, in some embodiments, the controller 340 of the machine learning controller 252 or the external device 305 performs some or all of the steps described above with respect to FIG. 7.

Figure 8:
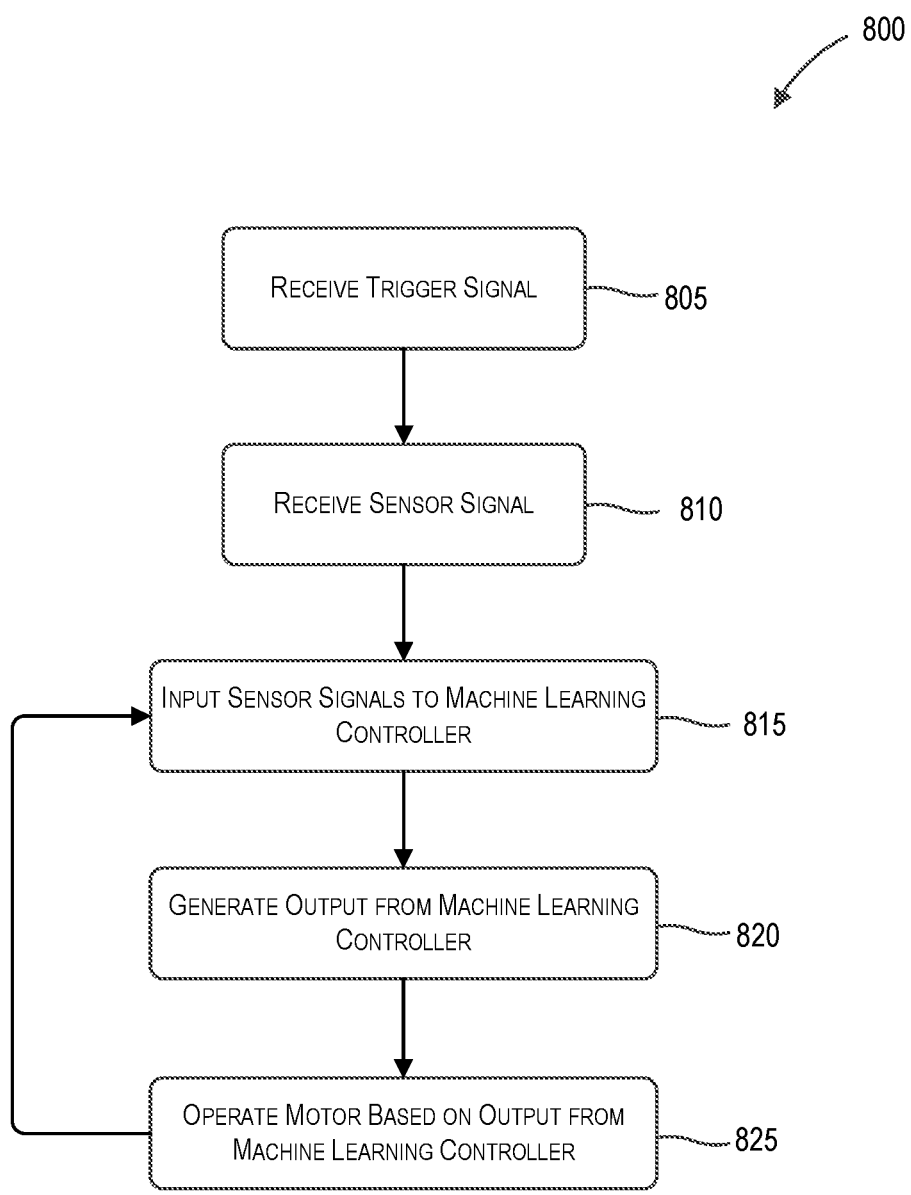
FIG. 8 is a flowchart illustrating a method of operating the power tool of FIG. 1 using to the machine learning controller.

FIG. 8 is a flowchart illustrating a method 800 of operating the power tool 100 according to the machine learning controller 252 as referenced in step 720 of FIG. 7. In step 805, the power tool 100 receives a trigger signal from the trigger 260 indicating that the power tool 100 is to begin an operation. During operation of the power tool 100, the controller 200 receives output sensor data (step 810) from the sensors 250. As discussed above, the output sensor data provide varying information regarding the operation of the power tool 100 including, for example, motor position, motor speed, spindle position, spindle speed, output torque, position of the power tool 100, battery pack state of charge, and the like. In some embodiments, the output sensor data is from a motion sensor. For example, the motion sensor may be used to indicate operation of the power tool 100 based on the level of vibration experienced by the power tool (e.g., high vibration indicates tool usage and low vibration indicates that the tool has not yet been operated or has finished being operated). The controller 200 then provides at least some of the sensor data to the machine learning controller 252 (step 815). In embodiments in which the controller 200 implements the machine learning control 350, the controller 200 bypasses step 815. When the power tool 100 does not store a local copy of the machine learning controller 252 the controller 200 transmits some or all of the sensor information to the server 325 where the machine learning controller 252 analyzes the received information in real-time, approximately real-time, at a later time, or not at all.

The sensor information transmitted to the machine learning controller 252 varies based on, for example, the particular task for the machine learning controller 252. As discussed above, the task for the machine learning controller may vary based on, for example, the type of power tool 100. For example, in the context of an impact driver, the machine learning controller 252 for the power tool 100 may be configured to identify a type of application of the power tool 100 and may use specific operational thresholds for each type of application. In such embodiments, the controller 200 may transmit, for example, the rotating speed of the motor 150, the rotating speed of the spindle, the operating mode of the power tool, but may not send the battery pack state of charge. The machine learning controller 252 then generates an output based on the received sensor information and the particular task associated with the machine learning block (step 820). In the example above, the output of the machine learning controller 252 may indicate a type of application for which the power tool 100 is being used. The controller 200 then operates the motor 150 based on the output from the machine learning controller 252 (step 825).

The power tool 100 described above with respect to FIGS. 1-8 may be used to execute power tool operations. For example, the power tool 100 may execute a fastening application that includes multiple fasteners. The power tool 100 may use any combination of the sensors 250 and controllers (e.g., controller 200, wireless communication controller 255, machine learning controller 252) described above to determine the success and/or progress of a multiple fastener application.

In some embodiments, the controller 200 of the power tool 100 may combine the data from multiple sensors to determine that an operation of the power tool 100 has been completed or that some portion of the operation has been completed. For example, the controller 200 may determine and track the position of the power tool 100 over time, and thus determine when a fastening application is complete based on the position information. This method of operation is referred to as "dead reckoning." Dead reckoning uses the sensors 250, specifically motion sensors, to extrapolate the power tool's position in free space over time. When using dead reckoning, it can be assumed that the position of the power tool 100 is relatively fixed during operation of the power tool 100. For example, during each fastening step of the fastening application the power tool 100 may be in a relatively fixed position such that movement experienced by the power tool 100 is a user moving between elements of an operation (e.g., moving between fasteners in a fastening application).

Figure 9A:
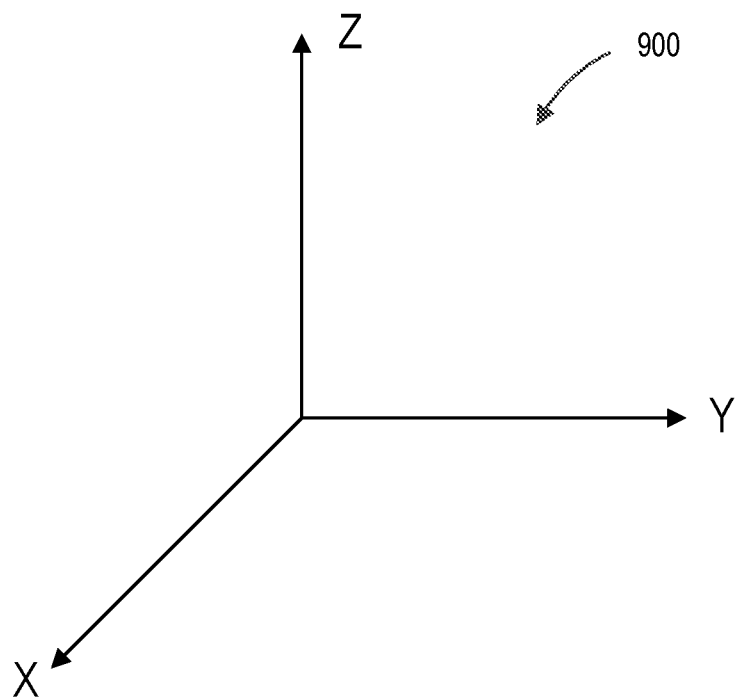
FIG. 9A illustrates a three-axis coordinate system.
Figure 9B:
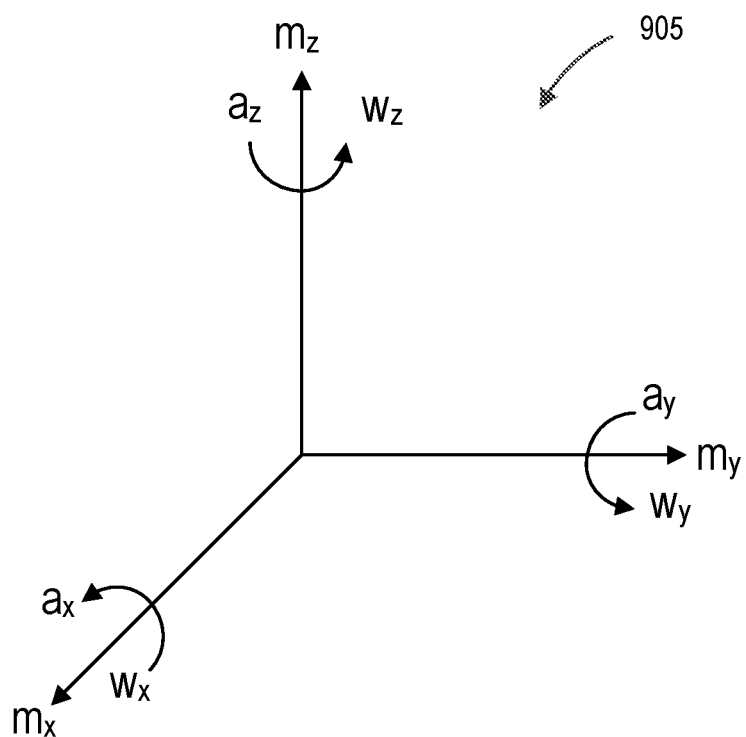
FIG. 9B illustrates the three-axis coordinate system of FIG. 9A applied to the power tool of FIG. 1.

FIG. 9A illustrates a conventional coordinate system 900 for use with the power tool 100. FIG. 9B illustrates a coordinate system 905 according embodiments of the power tool 100 tracking multiple fastener operations. The conventional coordinate system 900 uses an X-axis, a Y-axis, and a Z-axis to describe three-dimensional ("3D") movement. The coordinate system 905 combines signals and data from sensors, specifically the accelerometer, the gyroscope, and the magnetometer, using sensor fusion to determine the position, orientation, and movement of the power tool 100. Fusing the position, movement, and orientation data from the sensors, the controller 200 may extrapolate the position of the power tool 100 over time. The position of the power tool 100 over time can be described using the coordinate system 905. In some embodiments, only the accelerometer and the gyroscope or only the accelerometer are used.

The coordinate system 905 represents a nine-axis coordinate system. The nine-axes are broken down into three subsets of axes corresponding to an accelerometer, a gyroscope, and a magnetometer. In some embodiments, the axes may correspond to other sensors such as wheels, blades, and velocity sensors. The coordinate system 905 uses the axes mx, my, and m, as determined by magnetometer data. The motion of the power tool 100 taking gravity into account is described using axes ax, ay, and a, as determined by the accelerometer. As described above, the accelerometer data can be integrated twice to determine the position of the power tool 100. Given that the power tool 100 is assumed to be at a generally fixed position during a fastening application, the accelerometer data, for example, is only integrated when the power tool 100 is moved in free space. The rotation of the power tool 100 is described using axes $w_x$, $w_y$, and $w_z$ as determined by the gyroscope. Capturing the rotation of the power tool 100 is beneficial in determining the position of the power tool because lateral and vertical accelerations can become mangled if merely sensed by the accelerometer. In some embodiments, the rotation of the tool may be expressed using alternative coordinate systems (e.g., Euler angles, polar coordinates, quaternions, etc.).

In some embodiments, the coordinate system 905 may have more or fewer axes. For example, the coordinate system of the power tool may only use three axes corresponding to the accelerometer and a single axis (preferably aligned with the central axis) corresponding to the gyroscope. The rotation of the power tool as sensed by the gyroscope may have a single axis, two axes, or these axes. Fewer axes may be more cost-effective than using multiple axis, but the greater the number of sensing axes available allows for sensor fusion techniques that can minimize errors in tracking the motion of the power tool 100. In some embodiments, a single sensing axis, such as a single-axes accelerometer, is an effective coordinate system for a power tool to use to determine whether a fastener has been engaged or disengaged. Knowing that the power tool has disengaged from a fastener enables a controller to gain confidence that the power tool was correctly engaged with the fastener and engages with the correct next fastener.

Dead reckoning uses the data described using the coordinate system 905 to determine what operation the power tool 100 is being used for and what part of the operation the power tool 100 has completed (or is completing). Specifically, dead reckoning can be used to measure pure distances, relative displacements, etc. Distance based dead reckoning works particularly well for applications such as coupling fasteners and lug nuts where the number and distance of the motions are limited. However, in some embodiments, values outside of the distance/directional space, such as velocities or accelerations, can also be used. For example, dead reckoning can be used to derive general or overall movement of the power tool using the data from the coordinate system 905. Techniques such as integration of the magnitude of movement, mean squared movement multiplied by duration, peak filtered acceleration (e.g., gravity compensated), or two-dimensional ("2D") integration may be used. In some embodiments, dead reckoning can be used to determine the speed of the movement of the power tool 100. Specifically, a minimum speed may be identified to determine that a first fastener has been fastened and that the user is moving to a second fastener in a fastening application. Additionally, monitoring an amount of time that elapses between power tool runs (e.g., actuations) provides an input for tracking multiple fastener operations.

Figure 10:
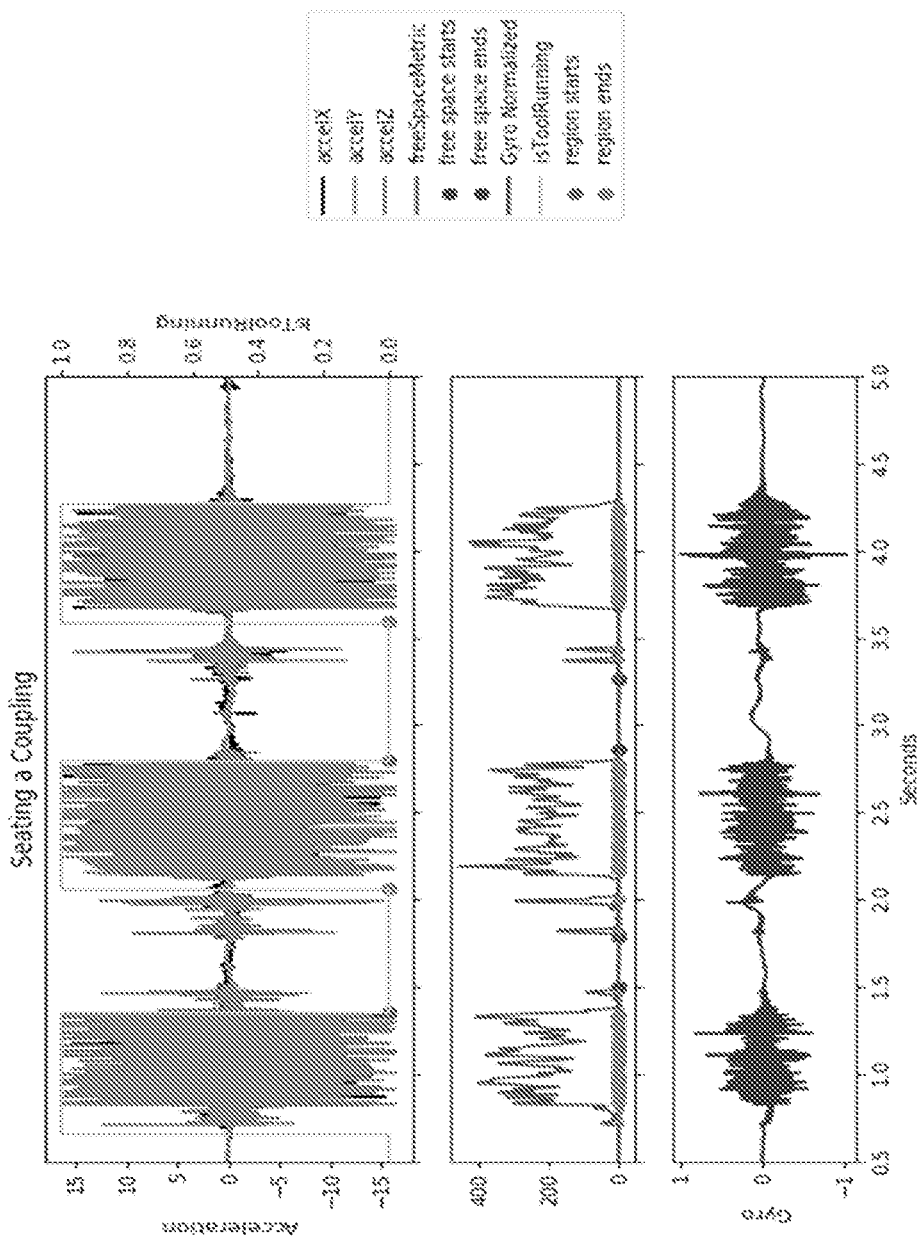
FIG. 10 is a graph of an example operation of the power tool of FIG. 1.
Figure 11:
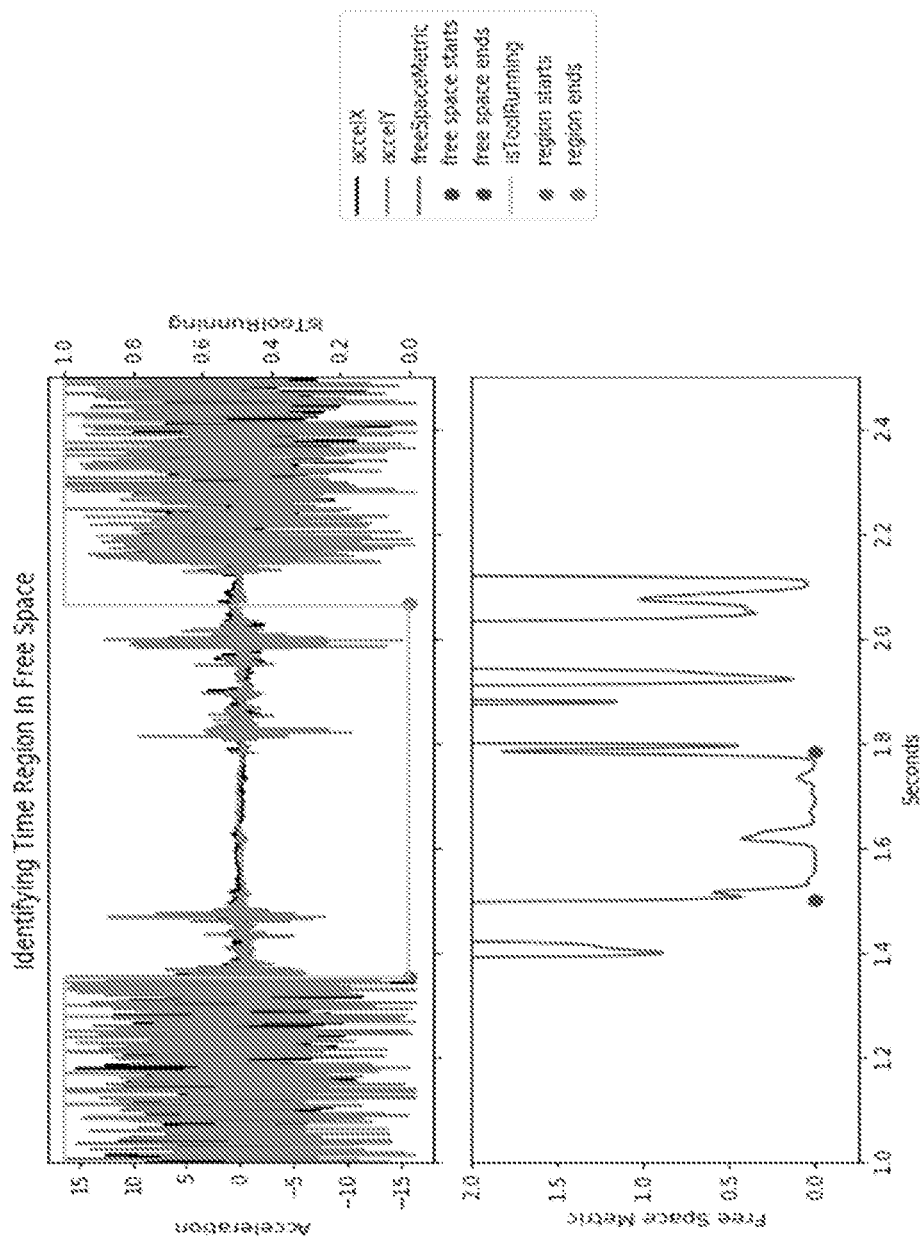
FIG. 11 is a magnified view of the graph of FIG. 10.
Figure 12:
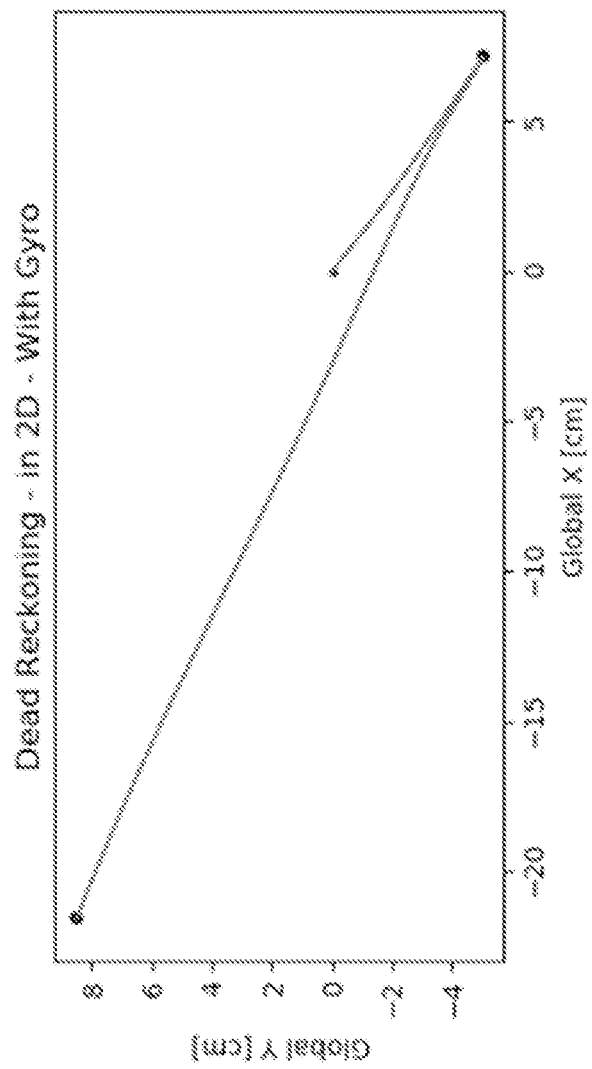
FIG. 12 is a graph of an operation of the power tool of FIG. 1

FIGS. 10-12 illustrate motion data for an example operation implementing dead reckoning. In particular, FIG. 10 illustrates a graph of an operation for seating a coupling. During this operation, a first bolt is tightened and then a second bolt is tightened. The power tool 100 may alternate between the two bolts until a user is satisfied with the tightness of the two bolts. Dead reckoning assumes that the power tool 100 is being operated in free space between fastening operations. When the controller 200 detects that the power tool 100 has been picked up by a user, or additionally or alternatively during or after a first fastening operation, the controller 200 begins to collect data from the sensors 250, specifically the accelerometer and the gyroscope. Alternatively, in some embodiments, the controller 200 continuously collects data from the sensors 250, regardless of usage of the power tool 100. For example, the controller 200 may set a first sampling rate of the sensors 250 when the power tool 100 is not determined to be in use and then may set a second sampling rate of the sensors 250 when the power tool 100 is determined to be in use. In order to determine the position of the power tool 100, the regions of free space should be isolated. The acceleration vibrations are recorded to determine when the tool is in free space. In some embodiments, the accelerometer may be programmed to compensate for gravitational acceleration. In some embodiments, when a user actuates the trigger 260 of the power tool 100, the controller 200 determines that the power tool 100 is being operated and will be relatively still while performing an operation.

As illustrated in FIG. 10, the first instance of the power tool 100 being in free space is between 1.5 seconds and 2.0 seconds. During free space operation, the user is moving the power tool 100 from a starting position to a first bolt or from the first bolt to the second bolt. As seen from the top plot, the accelerometer records many acceleration vibrations in the ax and ay directions when the power tool is being operated and many fewer when in free space. The middle plot shows the acceleration vibrations in the a, direction and a free space metric. The bottom plot shows the rotation data as sensed by the gyroscope. During free space operation, the power tool 100 is rotated. The straight lines of the top plot outline when the tool is running, as indicated by actuation of the trigger 260. The valleys of the line show when the tool is in free space. During operation of the tool, the acceleration vibrations and the rotation are both at peak values. The markers on the line signify the start and stop regions of free space.

FIG. 11 is a zoomed-in view of a portion of the graph of FIG. 10. The top plot shows the acceleration vibrations recorded from 1 second to 2.5 seconds. The bottom plot shows the free space metric during this time period. The free space metric lines up well with the acceleration vibration data in the top plot, verifying the identification of periods of free space using dead reckoning.

FIG. 12 illustrates a graph of the two-dimensional position of the power tool 100 as determined using dead reckoning. The controller 200 integrates the acceleration data from the accelerometer and fuses the integrated acceleration data with the rotation data from the gyroscope to determine position data of the power tool 100 during free space operation. As shown in the graph, during free space operation, the power tool 100 moves in the global x-direction and the global y-direction to change position from the first bolt to the second bolt.

Dead reckoning tracking of a multiple fastener operation works particularly well for applications involving small movement distances. Over larger distances where more integration of acceleration signals is used, integration errors can be detrimental to the tracking of the movement of the power tool 100. In some embodiments, the magnetometer can be used to compensate for motion drift and integration errors associated with dead reckoning. Other techniques for improving the accuracy of dead reckoning, such as the use of a Kalman filter, can also be used to correct for integration errors.

Additionally, dead reckoning data can be transmitted between tools (e.g., using the wireless communication controller 255. For example, dead reckoning data associated with a torque wrench (e.g., related to tightening five lug nuts) can be communicated to a torque wrench. The torque wrench can then be used to check the tightness of the lug nuts in the same order as they were tightened by the impact wrench.

Additionally or alternatively, the controller 200 of the power tool 100 may determine the status of an operation of the power tool 100 based on "crude logic." When using crude logic, the controller 200 uses, for example, sensor data from the accelerometer to determine the motion of the power tool 100. The controller 200 receives data from the accelerometer and uses that acceleration data to determine that the power tool 100 has changed positions over time. As the accelerometer records data over time, changes in the acceleration data can be identified by identifying, for example, maximum and minimum acceleration values. Based on the changes in acceleration of the power tool 100, the controller 200 can determine that the power tool 100 has finished an operation and is moving in free space.

Figure 13:
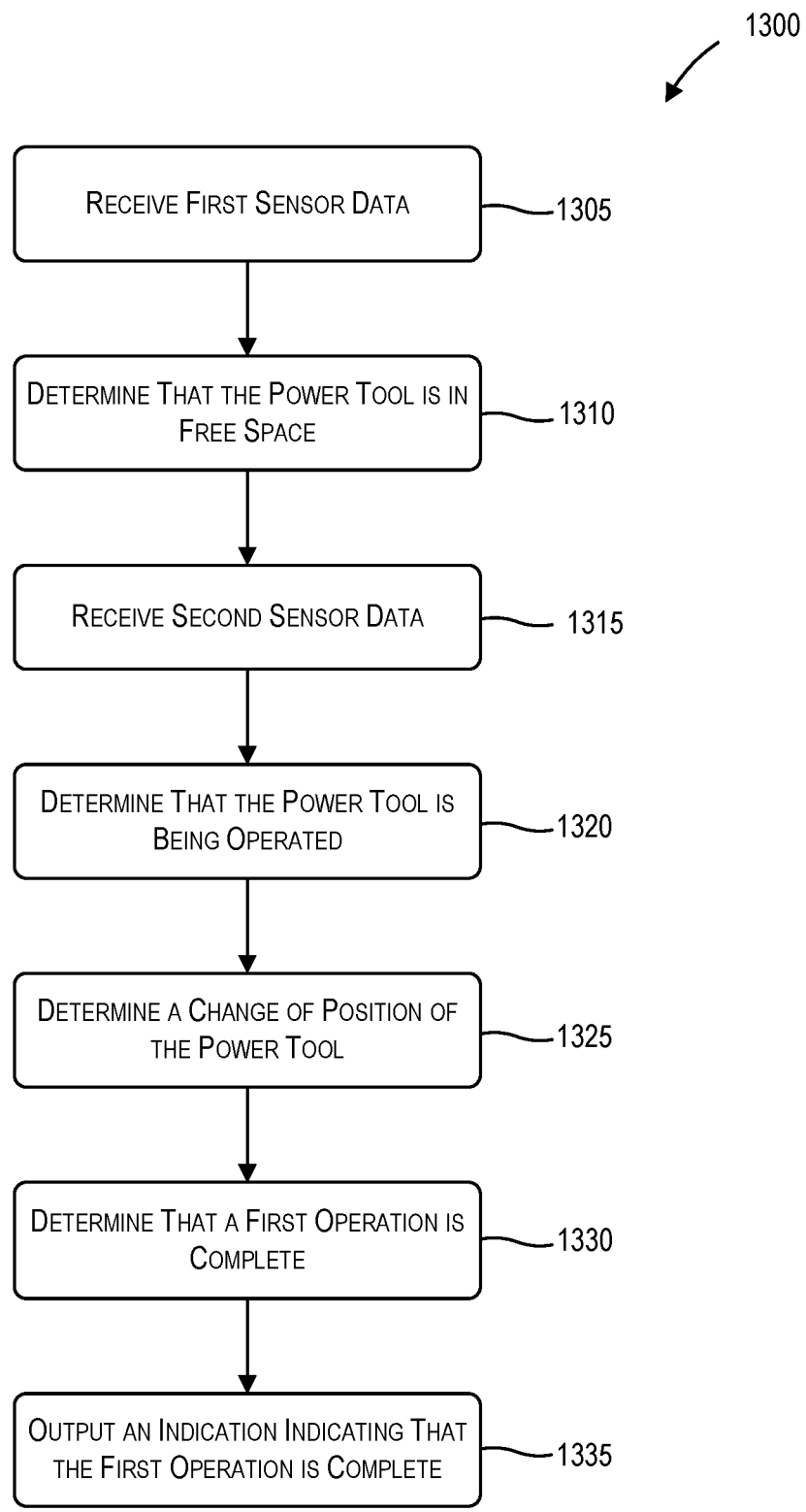
FIG. 13 is a flowchart illustrating a method of operating the power tool of FIG. 1.

FIG. 13 is a method 1300 for determining if an operation of a power tool 100 is complete according to the embodiments described herein. In step 1305, the controller 200 receives first sensor data. For example, first sensor data may be data from the accelerometer and indicative of acceleration vibrations of the power tool 100, from the gyroscope and indicative of the rotation of the power tool 100, and from the magnetometer and used to compensate for errors from the other sensors. In some embodiments, the first sensor data may come from a single sensor. For example, the first sensor data may come from a motion sensor that indicates an operation of the power tool (e.g., high vibration indicates tool use and low vibration indicates that tool use has not started or has finished). In step 1310, the controller 200 determines that the power tool 100 is in free space. The controller 200 may determine that the power tool 100 is in free space as described above with respect to FIGS. 10-12.

In some embodiments, the method 1300 may begin at step 1315. In step 1315, the controller 200 receives second sensor data. For example, second sensor data may indicate that the trigger 260 has been actuated. In step 1320, the controller 200 determines that the power tool 100 is being operated. The controller 200 determines that the power tool 100 is being operated based on, for example, the trigger 260 being actuated. In step 1325, the controller 200 determines that the power tool 100 has changed position. The controller 200 may determine that the power tool 100 has changed position based on the first sensor data or a combination of the first sensor data and the second sensor data. For example, in some embodiments the controller 200 may determine the position of the power tool 100 right as the trigger 260 is no longer actuated and then determine the position of the power tool in relation to the previous position when the trigger 260 is actuated once again. In some embodiments, the position of the power tool 100 changes as the power tool 100 moves through free space. Position and/or movement data can be determined by the double integration of acceleration data from the accelerometer. In some embodiments, the controller 200 may continually receive the first sensor data and determine that the power tool 100 is once again in free space. Once the controller 200 determines that the power tool 100 is no longer in free space, the controller 200 may determine a new position of the power tool 100 based on the first sensor data.

In step 1330, a first operation is determined to have been completed. In some embodiments, an operation profile is determined by the controller 200 during a rundown pass of the power tool 100 in an operation. For example, during a preliminary rundown pass, a user may guide the power tool 100 through the intended operation, such that the controller 200 may determine what the operation is and how many components (e.g., lug nuts, bolts, etc.) are included in the operation. In some embodiments, the machine learning controller 252 may determine what operation is being performed and how many components are included in the operation based on the first sensor data and the second sensor data collected by the first sensor and the second sensor, respectively. For example, the machine learning controller may receive the first sensor data and the second sensor data and determine the operation being performed using machine learning. In some embodiments, the operation profile is analyzed by the machine learning controller 252. For example, the machine learning controller 252 may receive the sensor data from the rundown pass and compare the sensor data and the determined operation profile to a stored operation profile to determine that the current operation profile is a part of a larger, stored operation profile (e.g., a fastening operation for a tire of a vehicle is performed four times, corresponding to the four tires of a vehicle). The machine learning controller 252 may store operation profiles that have either been previously learned by the machine learning controller 252 or programmed into the machine learning controller 252. In some embodiments, the controller 200 may determine that an operation has been based on a signal from a sensor that senses motor parameters. For example, based on a motor torque, the controller 200 may determine that the power tool 100 has tightened a fastener a predetermined amount. The predetermined amount corresponds to a specific operation profile. For example, based on motor torque, the controller 200 may determine that a fastener is completely fastened.

In step 1335, an indication indicating that the first operation is complete is outputted (e.g., to the indicators 245). In some embodiments, the indication may be a flashing LED. In some embodiments, the indication may be a completed status displayed on a screen of the power tool 100. In some embodiments, the indication may be a completed status displayed on the screen of an external device (e.g., a smartphone).

Figure 14A:
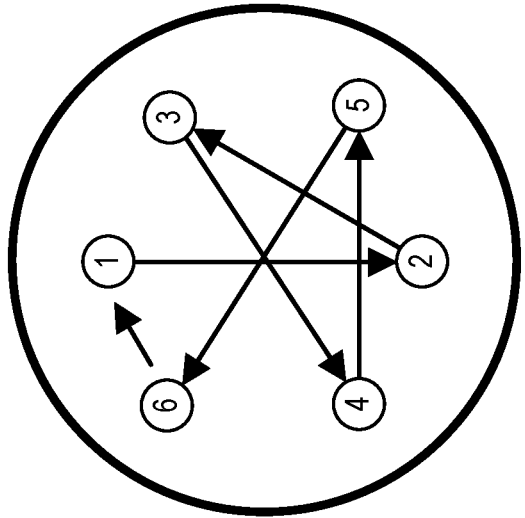
FIGS. 14A, 14B, and 14C are example applications of the power tool of FIG. 1.
Figure 14B:
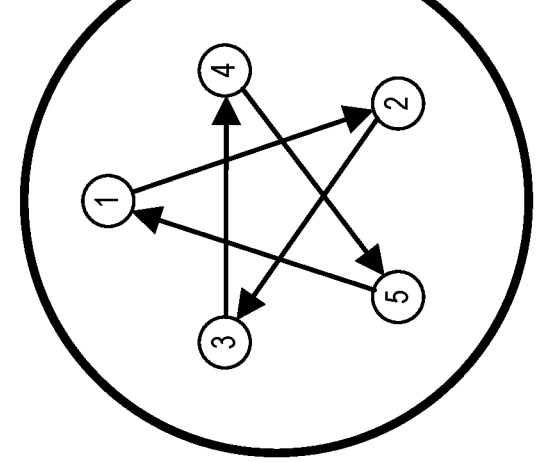
Figure 14C:
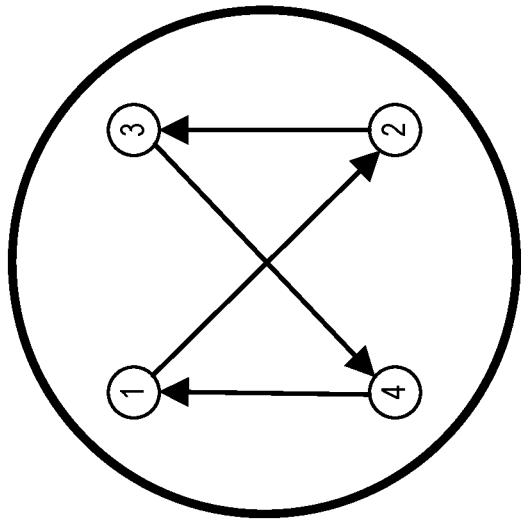

FIGS. 14A-14C illustrate example fastening applications. FIG. 14A illustrates a first fastening application 1400 of the power tool 100. The first fastening application 1400 is implemented on, for example, a tire of a vehicle having four lug nuts arranged in a square pattern. The lug nuts of the first fastening application 1400 are intended to be tightened in the particular order illustrated in FIG. 14A. In some embodiments, a user may begin the first fastening application 1400 at a lug nut other than the first lug nut. FIG. 14B illustrates a second fastening application 1405 of the power tool 100. The second fastening application 1405 is implemented on a tire of a vehicle having five lug nuts arranged in a star pattern. The lug nuts of the second fastening application 1405 are intended to be tightened in the order illustrated in FIG. 14B. FIG. 14C illustrates a third fastening application 1410. The third fastening application 1405 is implemented on a tire of a vehicle having six lug nuts arranged radially equidistant from the center of the tire. The specific order of tightening the lug nuts may be started at any lug nut. The lug nuts may also be tightened clockwise or counter-clockwise (i.e., circular motion), as long as the order with which they are tightened is maintained.

The fastening application 1400, 1405, 1410 may be completed using the method 1300. The specific operation profiles relating to the fastening applications 1400, 1405, 1410 will be described in detail below with respect to FIG. 16.

Figure 15:
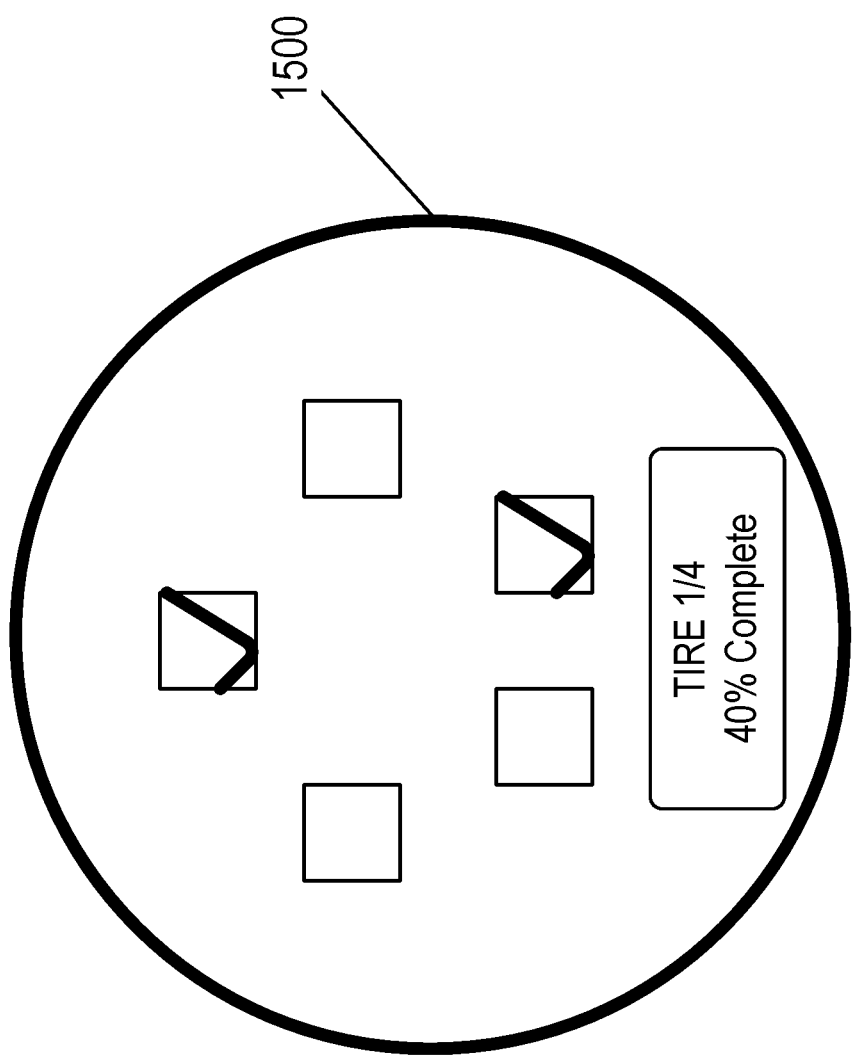
FIG. 15 is an example graphical user interface illustrating an example operation of the power tool of FIG. 1.

FIG. 15 illustrates an example user interface 1500 displaying the status of a fastening application (e.g., for fastening application 1405). In some embodiments, the user interface 1500 may be a part of the power tool 100, a part of the battery pack 120, a part of an adapter (e.g., positioned between the battery pack 120 and the power tool 100), an attachment that attaches to the power tool 100, an external device that is in communication with the power tool 100 (e.g., a watch, a cell phone, a tablet, a TV, etc.), etc. In some embodiments, the user interface 1500 is positioned on a rear portion of the power tool 100 that faces a user during operation of the power tool 100. The user interface 1500 may display the status of the second fastening application 1405 in full. A user may receive real-time updates of which lugs have been tightened as determined using the method 1300. As previously described, a user may perform a rundown pass with the power tool 100 at each lug to fit the lug to the tire. Such an action allows the power tool 100 to determine what operation is being performed, as will be described in detail below with respect to FIG. 16. In some embodiments, the user interface 1500 may display the overall completion of the fastening application. For example, when the user interface 1500 reads "100% Complete," then the tire is properly secured. In some embodiments, the user interface 1500 may display a representation of the motion of the power tool that includes traced lines.

In some embodiments, the power tool 100 does not know the actual first fastener in a multiple fastener operation without receiving some indication that the next fastener will be the first fastener (or that the previous fastener was the first fastener). However, the power tool 100 can predict a first fastener (e.g., based on distance travelled since last tool activation) and determine whether it is likely that a fastener is not the first fastener. Absolute or relative movement information associated with the multiple fasteners, timing information associated with the multiple fasteners, and/or expectation of the number of fasteners then allow the power tool 100 to more accurately assess the status of the multiple fastener operation.

As described above, the power tool 100 and techniques described herein may be used for various power tool operations. These operations may include fastening applications such as seating a lug nut, seating a coupling, installing pipe flanges, an assembly process, etc. Each operation has a specific operation profile associated with it. The specific operation profiles may be determined by the power tool 100 during, for example, a rundown pass of the power tool 100 in the operation, as described above with respect to FIG. 13. In other embodiments, the operation profiles are stored in the power tool 100 and/or provided to the power tool 100 (e.g., from server 325). In some embodiments, a user selects a particular operation to be performed (e.g., using the interface 290, the external device 305, etc.). Specific operation profiles for example power tool 100 operations will be described below with respect to FIGS. 16-19.

Figure 16:
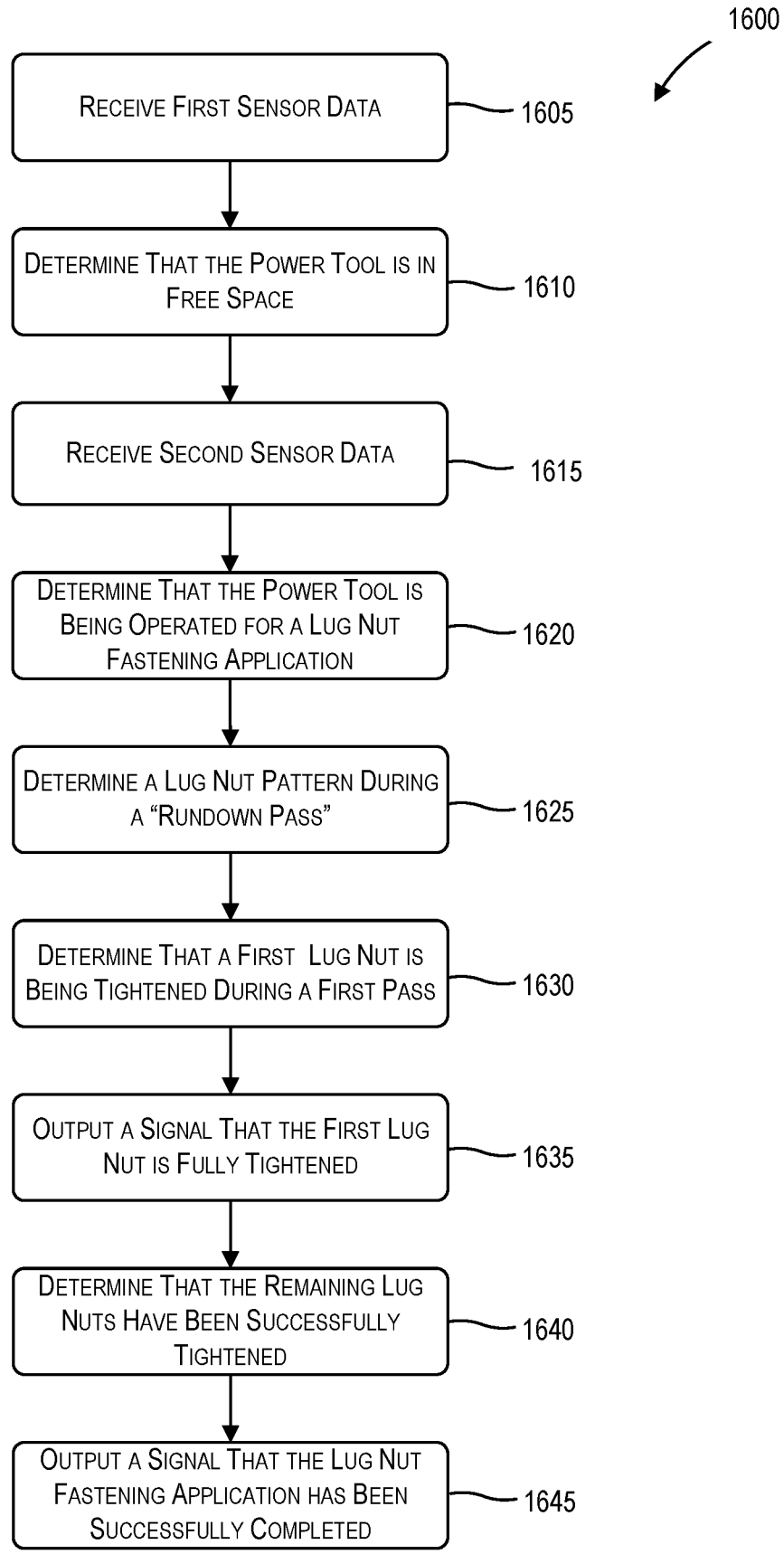
FIG. 16 is a flowchart illustrating a method of operating the power tool of FIG. 1.

FIG. 16 is a method 1600 of an operation profile for a lug nut fastening application. For example, the lug nut fastening application of may be the fastening applications 1400, 1405, 1410 pertaining to fastening lug nuts in various patterns described above with respect to FIGS. 14A-14C. In step 1605, the controller receives first sensor data. For example, first sensor data may be data from the accelerometer indicative of acceleration vibrations of the power tool 100, from the gyroscope indicative of the rotation of the power tool 100, and/or from the magnetometer for compensating errors from the other sensors. In step 1610, the controller 200 determines that the power tool 100 is in free space. The controller 200 may determine that the power tool 100 is in free space as described above with respect to FIGS. 10-12. In some embodiments, the machine learning controller 252 may determine the power tool 100 is in free space based on gesture detection, described in detail below. The power tool 100 is in free space prior to beginning a fastening application. In step 1615, the controller 200 receives second sensor data. For example, second sensor data may indicate that the trigger 260 has been actuated. In step 1620, it is determined that the power tool 100 is being operated for a lug nut fastening application, such as fastening applications 1400, 1405, 1410. In some embodiments, the controller 200 may determine that the operation being performed is a lug nut fastening application based on sensor data. For example, the orientation with which the power tool 100 is held with respect to gravity may be determined to be perpendicular to gravity by the accelerometer, such that the controller 200 may determine a lug nut fastening application is being performed. As another example, a torque or current sensor may sense the torque or current with which is required to rundown or seat a lug nut, and the controller 200 determines when a lug nut fastening application is being performed based on the value of the sensed torque or current. In some embodiments, the controller 200 may already know that the power tool 100 is being operated for a lug nut fastening application based on an input at the user interface 1500 prior to operation of the power tool 100.

In step 1625, a lug nut pattern is determined during a "rundown pass." In some embodiments, the lug nut pattern is stored in the power tool 100 and/or provided to the power tool 100 (e.g., from server 325). In some embodiments, a user selects a particular lug nut pattern to be performed (e.g., using the interface 290, the external device 305, etc.). The lug nut pattern corresponds to the specific operation profile. During the rundown pass, the user attaches the lug nut to a wheel stud for a tire of a vehicle with the power tool 100, such that the lug nut is attached, but not fully secured (step 1630). The user attaches a number of lug nuts corresponding to the lug nuts needed by the lug pattern. In some embodiments, the user attaches the lug nuts in a random order. In some embodiments, the user attaches the lug nuts in the specific order that they should be tightened. Regardless of the order that the lug nuts are attached, the controller 200 can determine the lug nut pattern and therefore the specific operation profile based on the number of lug nuts attached. In some embodiments, the machine learning controller 252 may determine the specific operation profile based on sensor data. For example, the machine learning controller 252 may receive the first sensor data and the second sensor data and determine the specific operation profile using machine learning. In some embodiments, the machine learning controller 252 may determine the specific operation profile without a rundown pass. In some embodiments, the controller 200 may determine the size of the wheel based on the lug nut pattern and how far apart each lug nut is from one another. The size of the wheel may correspond to a particular type of vehicle having particular lug nut seating requirements. In some embodiments, an improper wheel size may be detected for a particular type of vehicle resulting in the power tool 100 issuing an alert to the user.

In step 1635, a signal is output that the first lug nut is fully fastened. In some embodiments the signal may be a flashing LED. In some embodiments, the signal may be on a user interface. For example, the signal may correspond to a first mark on the location corresponding to the first lug nut as shown on the user interface 1500 of FIG. 15. In some embodiments, the specific operation profile might require multiple passes of tightening the lug nuts. When that is the case, the signal out in step 1635 may correspond to the first lug nut being partially tightened. For example, the first lug nut may be partially tightened during a first pass and then fully tightened on a second pass. To signify that a lug nut is partially tightened, the LED may flash with less frequency than when the lug nut is fully tightened. Alternatively, or additionally, the user interface may use a different mark than the first mark on the user interface to signify that the lug is only partially tightened.

In step 1640, it is determined that the remaining lug nuts have been successfully tightened. The controller 200 determines that the lug nuts have been successfully tightened when the operation profile corresponding to the fastening application is satisfied. To satisfy the operation profile, the lug nuts are tightened in the specific order corresponding to the number of lug nuts required by the operation profile (e.g., the number of trigger pulls is a multiple of the number of lug nuts and/or the expected number of passes). In some embodiments, the operation profile is not satisfied until the lug nuts on all four tires have been successfully fastened. In some embodiments, a user may spend less time tightening a particular lug nut (e.g., back off of a lug nut). For example, tightening one lug nut may result in the tightening of an opposing lug nut, such that when the user goes to tighten the opposing lug nut, the power tool is used for lesser amount of time to successfully tighten the opposing lug nut (e.g., seating confirmed with a torque or current measurement). As a result, different fastening profiles may be employed for each lug nut and for each pass of the power tool 100. In some embodiments, if the controller 200 determines that the user has fastened a lug nut out of the correct order, the controller 200 may cease operation and output a signal to the user that that the wrong lug nut is currently being tightened.

In step 1645, a signal indicating that the lug nut fastening application has been successfully completed is output. In some embodiments, the signal may be a change in color of the LED on the power tool 100. In some embodiments, the user interface may indicate that the lug nut fastening application is complete by displaying marks corresponding to completed at the location of each lug nut.

Figure 17:
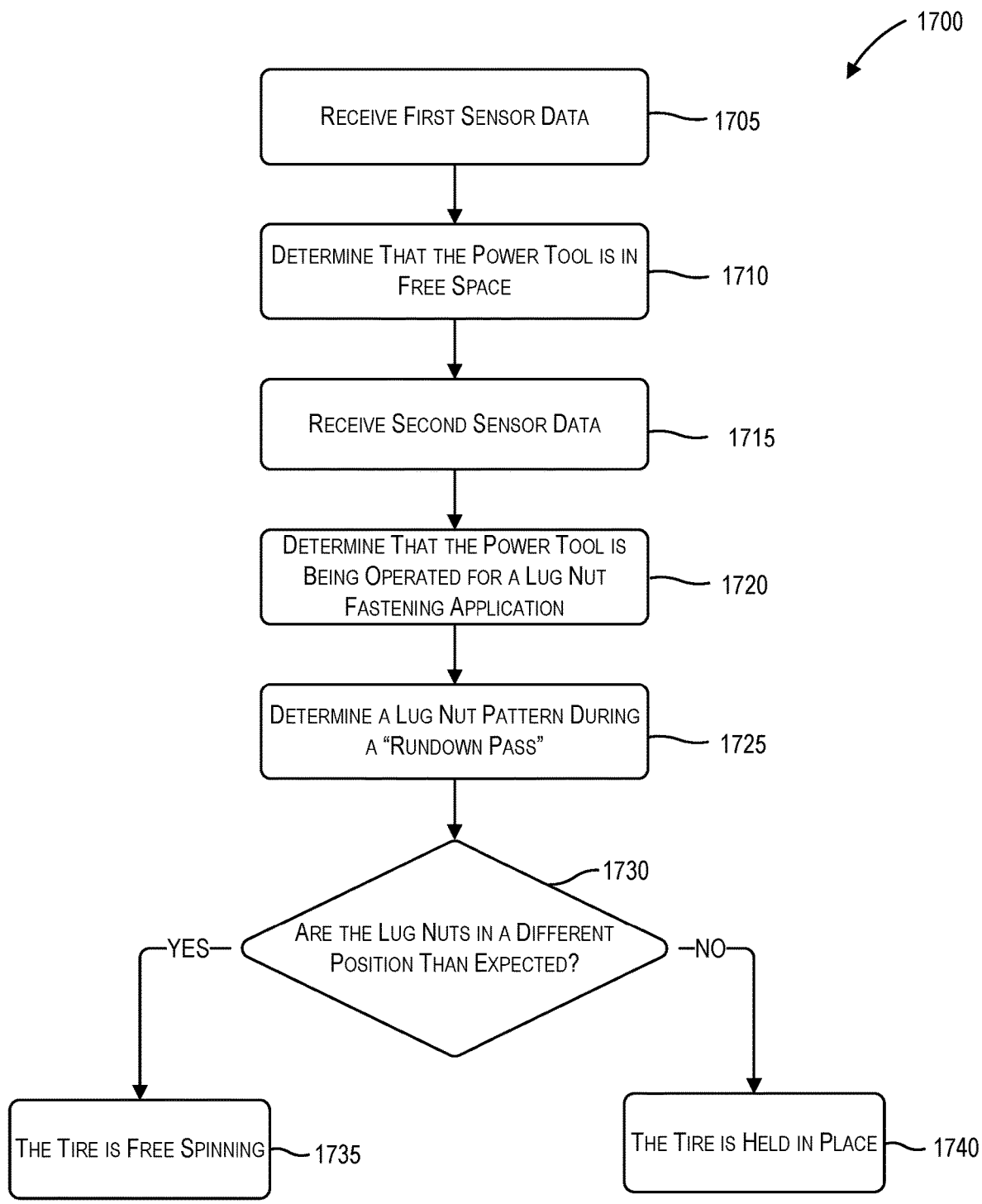
FIG. 17 is a flowchart illustrating a method of operating the power tool of FIG. 1.

FIG. 17 is a method 1700 of determining that a tire is free spinning during a fastening application. In step 1705, the controller 200 receives first sensor data. For example, first sensor data may be data from the accelerometer and be indicative of acceleration vibrations of the power tool 100, from the gyroscope and be indicative of the rotation of the power tool 100, and/or from the magnetometer for compensating errors from the other sensors. In step 1710, the controller 200 determines that the power tool 100 is in free space. The controller 200 may determine that the power tool 100 is in free space as described above with respect to FIGS. 10-12. In some embodiments, the machine learning controller 252 may determine the power tool 100 is in free space based on gesture detection, described in detail below. The power tool 100 is in free space prior to beginning a fastening application. In step 1715, the controller 200 receives second sensor data. For example, second sensor data may indicate that the trigger 260 has been actuated. In step 1720, it is determined that the power tool 100 is being operated for a lug nut fastening application, and specifically a lug nut fastening application for a vehicle tire, such as fastening applications 1400, 1405, 1410. In some embodiments, the controller 200 may determine that the operation being performed is a lug nut fastening application based on sensor data. For example, the orientation with which the power tool 100 is held with respect to gravity may be determined to be perpendicular to gravity by the accelerometer and the gyroscope, such that the controller 200 may determine a lug nut fastening application is being performed. As another example, a torque or current sensor may sense the torque or current with which is required to rundown or seat a lug nut, and the controller 200 determines when a lug nut fastening application is being performed based on the value of the sensed torque or current.

In step 1725, a lug nut pattern is determined during a "rundown pass." In some embodiments, the lug nut pattern is stored in the power tool 100 and/or provided to the power tool 100 (e.g., from server 325). In some embodiments, a user selects a particular lug nut pattern to be performed (e.g., using the interface 290, the external device 305, etc.). The lug nut pattern corresponds to the specific operation profile. During the rundown pass, the user attaches the lug nut to a wheel stud for a tire of a vehicle with the power tool 100, such that the lug nut is attached, but not fully secured. The user attaches a number of lug nuts corresponding to the lug nuts needed by the lug pattern. In some embodiments, the user attaches the lug nuts in a random order. In some embodiments, the user attaches the lug nuts in the specific order that they should be tightened. Regardless of the order that the lug nuts are attached, the controller 200 can determine the lug nut pattern and therefore the specific operation profile based on the number of lug nuts attached. In some embodiments, the machine learning controller 252 may determine the specific operation profile based on sensor data. For example, the machine learning controller 252 may receive the first sensor data and the second sensor data and determine the specific operation profile using machine learning. In some embodiments, the machine learning controller 252 may determine the specific operation profile without a rundown pass.

In step 1730, the controller 200 determines whether the lug nuts are in a different position than expected based on the specific operation profile. For example, the lug nuts may be configured in a particular lug nut pattern, but they may be spaced apart different from how the specific operation profile intends the lug nuts to be position based on their lug nut pattern. As described above, the movement of the power tool 100 allows the controller 200 to determine the fastening pattern during a multiple fastening operation. If the controller 200 determines that the lug nuts are in a different position than expected based on the lug nut pattern and power tool movement, then the method 1700 proceeds to step 1735. In step 1735, the controller 200 determines that the tire is free spinning. If, at step 1730, the controller 200 determines that the lug nuts are in the correct position, then the method 1700 proceeds to step 1740. In step 1740, the controller 200 determines that the tires is being held in place. In some embodiments, the tire may be held in place when the vehicle is on the ground such that the weight of the vehicle holds the tire in place.

In some embodiments, the controller 200 may determine that the tire is free spinning if it is determined that the tire is elevated off the ground. The tire may be determined to be elevated off the ground if a user picks up the power tool 100 (e.g., based on accelerometer and gyroscope outputs) and actuates the trigger to begin a lug nut fastening application at a certain height off the ground (e.g., based on distance from integrated acceleration). In some embodiments, the controller 200 may determine that the tire is free spinning if the controller 200 senses centripetal acceleration or axial rotation during a lug nut fastening application. For example, a torque or current sensor may sense centripetal acceleration or axial rotation during the lug nut fastening application. A free spinning tire may result in different torque transfer than a tire that is held in place. In some embodiments, the machine learning controller 252 may determine that the tire is elevated off the ground based on gesture detection.

Figure 18:
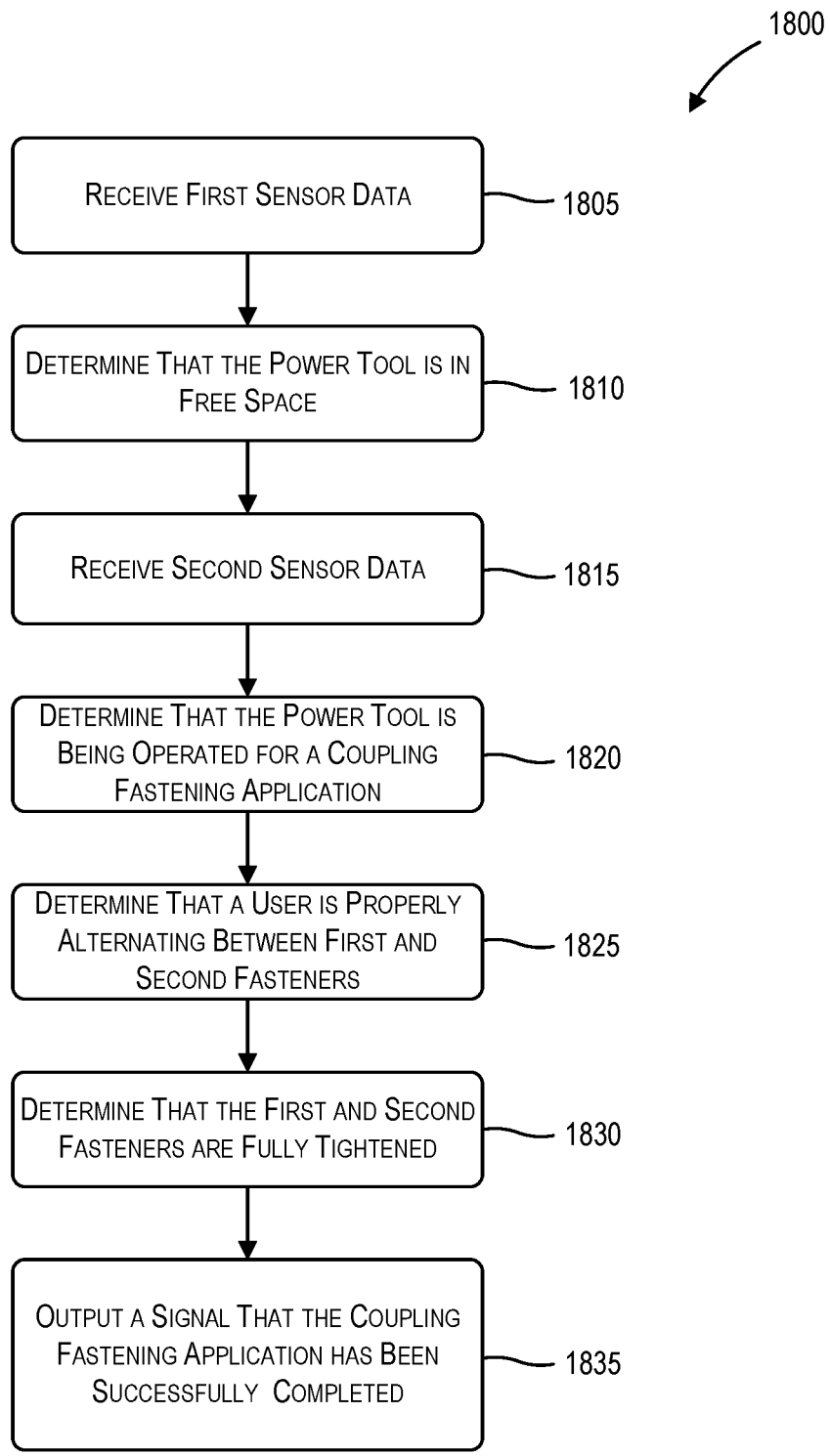
FIG. 18 is a flowchart illustrating a method of operating the power tool of FIG. 1.

FIG. 18 is a method 1800 of an operation profile for a two-fastener coupling fastening application. In step 1805, the controller 200 receives first sensor data. For example, first sensor data may be data from the accelerometer and be indicative of acceleration vibrations of the power tool 100, from the gyroscope and be indicative of the rotation of the power tool 100, and/or from the magnetometer and be used to compensate errors from the other sensors. In step 1810, the controller 200 determines that the power tool 100 is in free space. The controller 200 may determine that the power tool 100 is in free space as described above with respect to FIGS. 10-12. In some embodiments, the machine learning controller 252 may determine the power tool 100 is in free space based on gesture detection, described in detail below. The power tool 100 is in free space prior to beginning a fastening application. In step 1815, the controller 200 receives second sensor data. For example, second sensor data may indicate that the trigger 260 has been actuated.

In step 1820, it is determined that the power tool 100 is being operated for a coupling fastening application. In some embodiments, the controller 200 may determine that the operation being performed is a coupling fastening application based on sensor data. For example, the controller 200 may determine that the user is moving the power tool 100 between a first fastener and a second fastener. In some embodiments, the controller 200 may determine that the coupling fastening application corresponds to a specific operation profile based on the relative spacing of the first fastener and the second fastener using the techniques described above for tracking power tool 100 movement. For example, a first operation profile may correspond to a coupling where the first fastener and the second fastener are 6 inches apart. In some embodiments, the machine learning controller 252 may determine the specific operation profile based on sensor data. For example, the machine learning controller 252 may receive the first sensor data and the second sensor data and determine the specific operation profile using machine learning. In some embodiments, the controller 200 may already know that the power tool 100 is being operated for a coupling fastening application based on an input at the user interface 1500 prior to operation of the power tool 100.

In step 1825, the controller 200 determines that a user is properly alternating between the first fastener and the second fastener. In some embodiments, the operation profile may include multiple passes of the fastening application. For example, the operation profile may include a "rundown" pass for the first fastener (e.g., a first operation) and then a "rundown" pass for the second fastener (e.g., a second operation) before moving to a tighten pass for the first fastener (e.g., a third operation) and then a tighten pass for the second fastener (e.g., a fourth operation). If a user does not alternate between the first fastener and the second fastener correctly, the controller 200 may cease operation (e.g., by controlling the motor to stop) and output a signal to the user that that the wrong fastener is currently being tightened. In step 1830, it is determined that the first fastener and the second fastener are fully tightened. The controller 200 determines that the fasteners have been fully tightened when the operation profile corresponding to the coupling fastening application is satisfied. To satisfy the operation profile, the fasteners are fully tightened after being correctly alternated between as required by the operation profile. In some embodiments, the operation profile is not satisfied until couplings of a parent application (e.g., full run of a pipe, full jobsite, etc.) have been fully fastened. In some embodiments, a user may spend less time tightening a particular fastener. For example, tightening the first fastener may result in tightening of the second fastener, such that when the user goes to tighten the second fastener, the power tool 100 is used for less time to successfully tighten the second fastener (e.g., back off of a fastener). In some embodiments, the coupling may only have one fastener. For example, the controller 200 may determine that the "rundown" pass has occurred (e.g., first operation has occurred based on a change in the height of the power tool 100 which would indicate the fastener has been tightened) and may then determine a tighten pass has occurred for the fastener. In this embodiment, the operation profile is satisfied when the fastener is fully fastened.

In step 1835, a signal indicating that the coupling fastening application has been successfully completed is output. In some embodiments, the power tool 100 recommends switching between fasteners or engaging a particular fastener in order to complete the coupling fastening application. In some embodiments, the signal may correspond to a change in color of an LED on the power tool 100 between a rundown pass and a seating pass. In some embodiments, a user interface may indicate that the coupling fastening application is complete by displaying marks corresponding the first and second fasteners that indicate the fastening application is complete. In some embodiments, LEDs are alternately illuminated to identify a first (e.g., left) or second (e.g., right) fastener being fastened.

Figure 19:
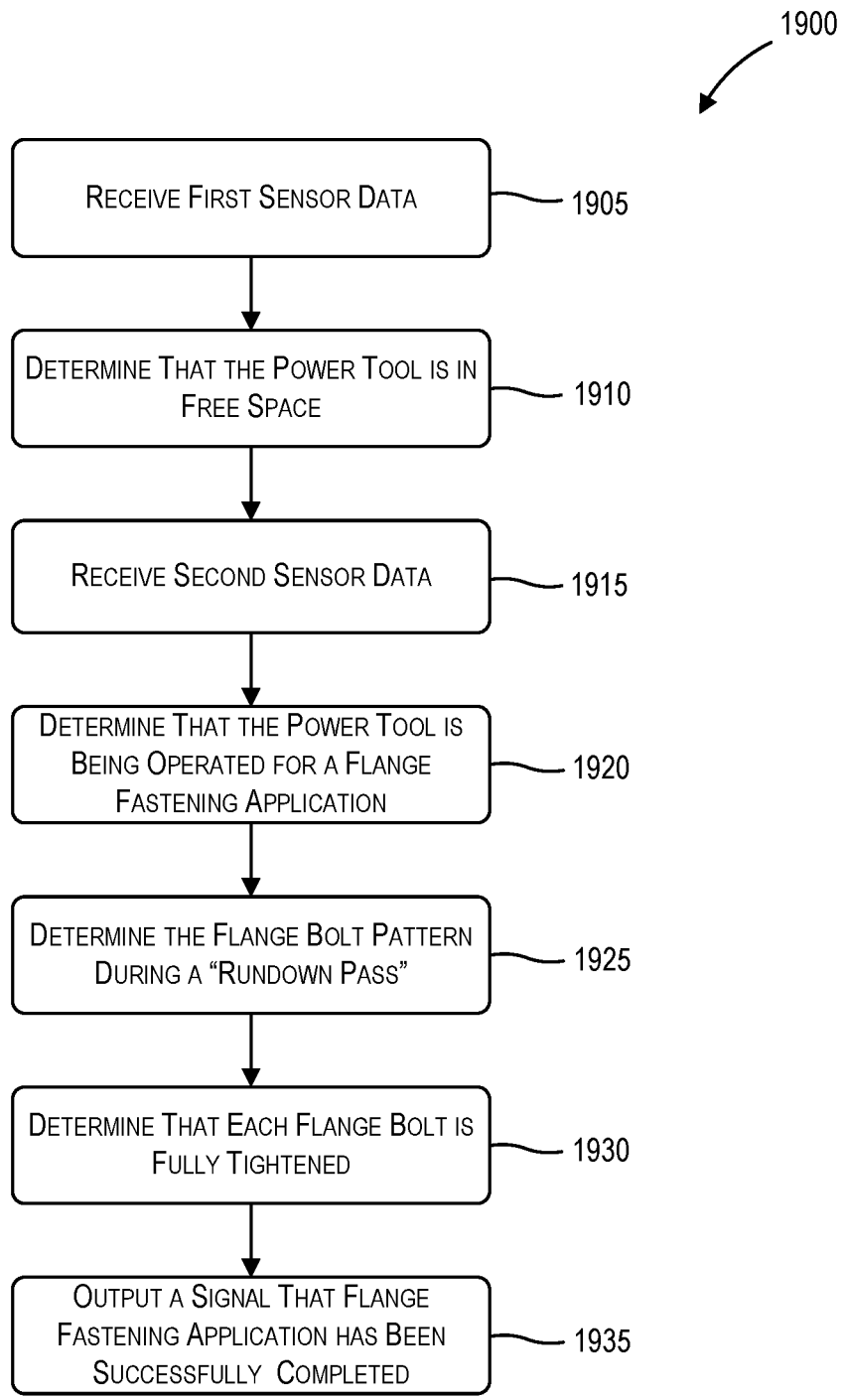
FIG. 19 is a flowchart illustrating a method of operating the power tool of FIG. 1.

FIG. 19 is a method 1900 of an operation profile for a flange fastening application. In step 1905, the controller receives first sensor data. For example, first sensor data may be data from the accelerometer and be indicative of acceleration vibrations of the power tool 100, from the gyroscope and be indicative of the rotation of the power tool 100, and/or from the magnetometer and be used to compensate for errors from the other sensors. In step 1910, the controller 200 determines that the power tool 100 is in free space. The controller 200 may determine that the power tool 100 is in free space as described above with respect to FIGS. 10-12. In some embodiments, the machine learning controller 252 may determine the power tool 100 is in free space based on gesture detection, described in detail below. The power tool 100 is in free space prior to beginning a fastening application. In step 1915, the controller 200 receives second sensor data. For example, second sensor data may indicate that the trigger 260 has been actuated. In step 1920, it is determined that the power tool 100 is being operated for a flange fastening application. In some embodiments, the controller 200 may determine that the operation being performed is a flange fastening application based on sensor data or based on an input from a user. In some embodiments, the controller 200 may determine that the flange fastening application corresponds to a specific operation profile based on the relative spacing of the flange bolts using the techniques described above for tracking power tool 100 movement. In some embodiments, the controller 200 may already know that the power tool 100 is being operated for a flange fastening application based on an input at the user interface 1500 prior to operation of the power tool 100.

In step 1925, a flange bolt pattern is determined during a "rundown pass." In some embodiments, the flange or flange bolt pattern is stored in the power tool 100 and/or provided to the power tool 100 (e.g., from server 325). In some embodiments, a user selects a particular flange bolt pattern to be performed (e.g., using the interface 290, the external device 305, etc.). The flange bolt pattern corresponds to the specific operation profile. During the rundown pass, the user attaches a flange using bolts to a pipe with the power tool 100, such that the flange is attached, but the bolts are not fully secured. The user attaches a number of flange bolts corresponding to the flange bolts needed by the flange pattern. In some embodiments, the user attaches the flange bolts in a random order. In some embodiments, the user attaches the flange bolts in the specific order that they should be tightened. Regardless of the order that the flange bolts are attached, the controller 200 can determine the flange bolt pattern and therefore the specific operation profile based on, for example, the number of flange bolts attached. The flange bolts may be arranged in a star pattern or a circular pattern. In some embodiments, the controller 200 may cease operation of the power tool 100 if the user attempts to overtighten a flange bolt during the rundown pass. In some embodiments, the machine learning controller 252 may determine the specific operation profile based on sensor data. For example, the machine learning controller 252 may receive the first sensor data and the second sensor data and determine the specific operation profile using machine learning. In some embodiments, the machine learning controller 252 may determine the specific operation profile without a rundown pass. In some embodiments, the controller 200 may determine the size of the pipe based on the flange bolt pattern and how far apart each flange bolt is from one another. The size of the pipe may also correspond to a type of pipe.

In step 1930, it is determined that all of the flange bolts of each flange have been successfully tightened. The controller 200 determines that the flange bolts of each flange have been successfully tightened when the operation profile corresponding to the fastening application is satisfied. To satisfy the operation profile, all of the flange bolts of each flange are fully tightened (e.g., the number of trigger pulls is a multiple of the number of flange bolts and/or the expected number of passes). In some embodiments, tightening the flange bolts of each flange occurs over multiple passes with the power tool 100. The controller 200 is able to determine which pass is being performed, and when the flange bolts are fully tightened. In some embodiments, a user may spend less time tightening a particular flange bolt. For example, tightening one flange bolt may tighten another flange bolt, such that when the user goes to tighten the other flange bolt, the power tool 100 is used for less time to successfully tighten the other flange (e.g., back off of a fastener). The operation profile may also not depend on time.

In step 1935, a signal indicating that the flange fastening application has been successfully completed is output. In some embodiments, the signal may be a change in color of an LED on the power tool 100. In some embodiments, the user interface may indicate that the flange fastening application is complete by displaying marks corresponding to completed at the location of each flange.

There are various other fastening and non-fastening applications that would benefit from the methods disclosed herein, as set forth in the below table.

| Type of Tool | Application(s) of Power Tool Tracking |
|---|---|
| Measuring Devices | Torque wrenches that recognize and inspect multiple fasteners: Number of fasteners inspected and order is tracked to ensure all fasteners are inspected |
| Rivet Guns<br>Nailers<br>Staplers | Power tool detects possible secondary (double) firings: Prevent double firings |
| Tool-to-Tool Communication | First tool notifies second tool of operation profile: Impact wrench notifies a torque wrench how many fasteners an operation profile includes |
| Assembly Tools | Assembly requires particular hole/fastener arrangement: Drill must drill a set of holes in a particular arrangement or pattern |
| Output Power Equipment<br>String Trimmers<br>Blowers | Outdoor power equipment adjusts output based on proximity to ground or object: String trimmer that adjusts output based on suspected proximity to the ground to maximize efficiency<br>Leaf blower that adjusts output based on suspected proximity to the ground to maximize efficiency |
| Tool Reporting and/or Tracking | Power tool general height and/or location: Power tool recognizes its approximate height and/or relative location to given reference point (e.g., starting point)<br>Power tool can determine if a user is fatigued or tired based on a negative change in position over the course of a fastening operation.<br>Power tool recognizes its typical location and orientation to determine if a user is right-handed or left-handed<br>Power tool recognizes gestures to determine if it is being used differently than it normally is used (e.g., if the tool was stolen or swapped-out)<br>Power tool recognizes characteristic of user to determine if the user is the typical or ordinary user of the power tool |
| Vehicles<br>Solar Panels<br>Brackets<br>Couplings | Fixed number of bolts for assembling solar panels and other assemblies:<br><br>Power tool verifies the correct number of bolts installed to record success of a fastening operation. |
| Fastening Tools<br>Bolt/Accessory Alignment | Power tool impact on bolt and fastener alignment: Power tool aids bolt and fastener alignment by rotating tool output to rotationally align with bolt when returning to a particular bolt.<br>The power tool may account for rotational degrees of symmetry of the output (e.g., a six-sided socket).<br>The power tool may dampen or slow tool output rotation to let a user overcome any drift.<br>Magnetometer and accelerometers are preferential for verifying tool orientation.<br>Power tool aids bolt and fastener alignment by automatically slowly rotating when approaching or upon contact with next bolt/fastener. Rotation may continue until engagement with the fastener is deemed complete (e.g., by forward axial motion of a socket engaging).<br>Power tool impact on fastening operation: Power tool may not allow continuing a fastening process (e.g., the power tool halts running) until the tool is properly engaged with the bolt/fastener/workpiece.<br>Dead reckoning is used to verify that the engagement with the fastener is sufficient (e.g., based on forwards motion of the tool and/or a sufficient contact signal). |

-continued

| Type of Tool | Application(s) of Power Tool Tracking |
|---|---|
| | Power tool automatically begins a fastening step upon engagement.<br>Engagement may be when the tool bumps/presses/makes contact with a workpiece.<br>The tool recognizes this motion and then automatically begins or enables a next fastening step (e.g., a drill for drywall screws automatically begins drilling, sometimes after a small delay, once the screw is pressed into the drywall).<br>Some of the above embodiments may be applicable during fastening operations for fastening wood, drywall, and sheet metal screws. |
| Continued Engagement of a Fastening Tool | Power tool engagement when a fastener (e.g., a Phillips head screw) is stripped:<br>Movement of the power tool analyzes movement to determine signature movements that are characteristic of stripping a fastener, disengagement from a fastener, or a fastener was poorly aligned (e.g., flat head screw fastened off-centered).<br>The controller of the power tool tracks the motion of the power tool in coordination with the output rotation and expected fastener threading such that the power tool can slow down or stop before stripping or disengaging from a fastener.<br>The power tool may also track movement to determine that a fastener and/or a bolt is removed. |
| Powered Ratchets and Torque Wrench with Automatic Return or Output Multiplier. | Powered ratchets and powered torque sticks torque optimization:<br>Powered ratchets and powered torque sticks lightly power themselves in reverse in-between pushes (e.g., compensating for gravity and inertia) such that the tool motion, rotational sensing of the output, and/or measured torque at the output contribute to a rotational movement identified by the power tool.<br>A user may cycle the powered ratchet and/or powered torque stick in less time and with greater ease.<br>Automatic, incremental reversal in-between pushes may prevent a socket from rotating a bolt backwards between engagements, decreasing the time of an installation.<br>A movement (as sensed by the powered ratchet and/or powered torque stick) may indicate an axial disengagement such that the incremental reversal would be halted.<br>Powered ratchets and powered torque sticks provide a powered output that moves faster than the rotation of the powered rachets and powered torque sticks.<br>In the case that a powered ratchets or powered torque sticks rotates 30°, the powered ratchets or powered torque sticks may rotate the output 100°.<br>The output rotation by the powered rachets or powered torque sticks may be a function of the rotation of the powered ratchets or powered toque sticks or a seating state of the powered ratches or powered torque sticks.<br>The powered ratchets or powered torque sticks may revert to a one-to-one output ratio (e.g., unpowered and relying on mechanical unbackdrivable mechanism) near a final or ending torque.<br>The powered ratchets or powered torque sticks may provide a powered output or powered brake in a backdrivable and/or reversed fashion to avoid over-torquing a fastener or bolt. |

-continued

| Type of Tool | Application(s) of Power Tool Tracking |
|---|---|
| Identification of Short vs. Long Sockets and/or Other Accessory or Fastener Characteristics Beginning Threaded Engagement | Power tool movement may provide a way to identify or estimate a physical size or other characteristic of a tool's accessories, thereby increasing precision torque control Power tool movement may indicate starting a bolt's engagement after being in free space. The power tool may operate at a reduced speed or with increased sensitivity to cross threading and misalignment during the begging stages of a threading operation |
| Tool Response Due to Overhead Use, Cramped Space Detection, Behind Wall Detection, Less Steady Holding, Side Handle Use, Fatigue Detection, Insufficient Bracing, etc. | A power tool with an auto-shutoff operation (e.g., anti-kickback, end-of-cut detection, etc.) may change its sensitivity, operation profile, or response based on any of operations conditions that are detectable based on at least in part the motion of the power tool. |
| Two Hand Verification/Side Handle Use | Power tools may have a user verify a second hand is engaged with the power tool by requiring the user to bump the tool against their second hand: For example, one hand cannot provide significant torque to a power tool, two hands spread at a distance can be used to verify a tool is held in at least two spread locations based on a sudden motion change of the power tool. This is useful for reciprocating saws, grinders, drills, and circle saws among other two-handed tools. This may be used to allow a tool to operate at higher torques or behave in other ways when a second hand's presence is confirmed. |
| Edger, Hedge Trimmer, String Trimmer, Vacuum, Mower, Screed, Polisher, Palm Sander, Grease or Caulk gun | Power tool output may be dependent on movement of the power tool: Movement of the power tool may be estimated at a distal end and by an effective feed rate. For example, a powered upright vacuum or edger may decrease output power when moved in reverse, as detected using dead reckoning based on sensor data. |
| Vacuum Accessory | A vacuum output (e.g., accessory or hose) may use dead reckoning to suggest a proximity and necessary suction of a particular location: For example, the vacuum output may be throttled when possible. As another example, the vacuum output may be adjusted when the output makes or breaks contact with a surface. |
| Sander, Planer, etc. | Track disengagement or off surface movement of a power tool from a workpiece. In particular, slow down or shutoff once the power tool is moved away from a workpiece. |
| Miter Saw | Track motion of blade (e.g., by an inertial measurement unit (IMU) on a part of a power tool with a blade that moves) and shutoff the power tool when a cutting operation is complete. Additionally, decrease the starting ramp up of the blade if the blade of the power tool translates. |
| Pressure Washer | A pressure washer may have an inertial measurement unit (IMU) that, with dead reckoning, tracks approximate distance and/or orientation of a workpiece, overlap with past pressure washed areas, hard to clean areas (e.g., undersides of vehicles), etc. The pressure washer may boost, throttle, or adjust the output of its hose depending on the distance and/or orientation of the workpiece, as determined by a controller of the pressure washer via dead reckoning. |
| Chainsaw | Chainsaw tracks the motion of a saw portion of the chainsaw: The chainsaw determines the relative height off the ground and adjusts the sensitivity levels for a bind-up characteristic of the saw portion. The chainsaw detects for underbucking or a different type of cut and adjusts the level of the bind-up. |
| Jigsaw, Reciprocating Saw, etc. | Saw detects the starting location (e.g., in or outside of the workpiece): The saw adjusts a starting profile and bind-up detection based on detection. |

| Type of Tool | Application(s) of Power Tool Tracking |
| --- | --- |
| Larger Tools Being Transported: Compactor, Trencher, Compressor, Mower, etc. | Larger tools detect a motion characteristic (e.g., moving onto or removing the tool from a pickup truck, dolly, crane, winch, forklift, etc.): Larger tool prevents operation of tool until after a delay has elapsed or a proper movement for use is detected. |
| Smaller Tools Being Transported: Handheld Power Tools. | Smaller tools detect motion and/or orientation characteristics (e.g., being worn on a belt clip, caught by a lanyard, hanging from a rafter hook, being secured in a tool below, moving on a rolling storage device, being lifted on a forklift, etc.): Smaller tool suspends or prevents operation until after delay or proper movement for use is detected. |
| Battery Insertion | Battery tracks a suspected attempt at inserting into a power tool or a charger: Upon not having an electrical connection (e.g., charger not powered, missing communication, etc.), the battery may alert a user to signify the battery is not fully depressed or the corresponding device is not functioning. |

Additionally or alternatively, as briefly discussed above, the controller 200 of the power tool 100 may interact with the machine learning controller 252 to determine the status of an operation of the power tool 100. For example, the machine learning controller 252 may be used to perform "gesture recognition" such as contacting a fastener (e.g., lateral shock), removing a socket from a fastener, aligning sockets, moving from one fastener to another fastener, setting a tool down, etc. In another example, the machine learning controller 252 may directly take an input in the form of sensor data provided by the controller 200 and derive a "mask" (e.g., an outline of a specific operation performed by the power tool 100) such as identifying the free space regions with embedded gestures and then output updates. These updates may be classifications or encoding of general actions (e.g., "Did user finish a first fastener and then move to a second fastener?"), a regression of motion, distance, displacement, velocity, etc., or a heatmap-like distribution of locations (e.g., displaying the duration the power tool 100 was at a certain location). The machine learning gesture recognition is a more precise technique for tracking the motion of the power tool 100, but is also more complex to implement and computationally intensive.

For example, the machine learning controller 252 receives sensor data from the controller 200. In some embodiments, machine learning is implemented after dead reckoning or crude logic has been completed by the controller 200. In some embodiments, the machine learning controller 252 may use machine learning techniques (e.g., DNN, CNNs, RNNs, attention networks, lambda networks, decision trees, linear regression, logistic regressions, SVM, KNN, etc.) to process the sensor data from the controller 200 for classifying the order with which an operation has been performed, identifying the type of operation and the subsequent application (e.g., seating a coupling, tightening lugs on a tire, etc.), identifying errors in the operation, etc. For example, an array of acceleration data over time may be directly fed (and/or processed then fed) into a neural network to classify a motion as going from a first fastener to a second fastener. In some embodiments, a combination of inputs from the controller 200 could be fed into the machine learning controller 252. For example, the inputs may be the position as the power tool 100 moves from a first fastener to a second fastener found from integrating the acceleration data, the alignment of the axes that the power tool 100 travels about from start to finish of the operation, the time between the steps of an operation, the relative direction of gravity at the start of an operation and at the end of an operation, or the derived maximum speed at which the operation was carried out. The output from the machine learning controller 252 using the input may be a verification that an operation of the power tool 100 was fully completed, start to finish. In some embodiments, the machine learning controller 252 may determine that an operation has not been completed based on the input from the controller 200.

In some embodiments, the above techniques can be used to implement motion tracking to determine a one-dimensional fastening application. For one-dimensional motion tracking, the controller 200 uses, for example, raw sensor data from the accelerometer to determine the motion of the power tool 100 for a fastening application where the fasteners are aligned along a parallel plane. For example, fastening applications such as vehicle lugs, pipe flanges, pipe couplings, etc. include fasteners that are aligned along a parallel plane. The fasteners of these fastening applications may be engaged by the power tool 100 in the same parallel plane along the main driving axis, such as an axis in the global x-direction. In some embodiments, fastening applications include an axial engagement with the fastener in the global y-direction. For example, fastening applications where a user brings the power tool 100 "forwards" preceding fastening a fastener and then brings the power tool 100 "backwards" after the fastener has been fastened. In some embodiments, gravity may be considered to be in the global z-direction. For example, gravity is considered "down" and the operation of gravity is vertically down such that the effect of gravity is minimized.

Though one-dimensional motion tracking may not allow the power tool 100 to determine if the lugs on a tire have been fastened in the correct order (i.e., the operational profile being executed correctly), the power tool 100 may be more confident that the user likely switched between fasteners during operation based on the change in position along the main driving axis.

One-dimensional motion in a one-dimensional fastening application can be tracked using an accelerometer. The accelerometer may have a single axis that is either partially or fully aligned with the driving axis of the power tool 100.

Alternatively, the accelerometer may be a multi-axis accelerometer such as the accelerometer discussed above with respect to FIG. 9B. As previously discussed, the controller 200 of the power tool 100 can take gravitational acceleration into account when processing the sensor data from the accelerometer to determine a change in position. Alternatively, the accelerometer may account for gravitational acceleration. If the power tool 100 is being operated such that the driving axis is in the direction of gravity, the power tool 100 and/or the accelerometer may be unable to distinguish between gravitational acceleration and acceleration based on the movement of the power tool 100. In some embodiments, raw, one-dimensional sensor data collected by the accelerometer may be filtered before, during, and/or after a fastening operation is complete in order to accurately compensate for gravitational acceleration. For example, the gravitational acceleration may be subtracted from the raw, one-dimensional sensor data when the power tool 100 stays aligned with the fastener.

Figure 20:
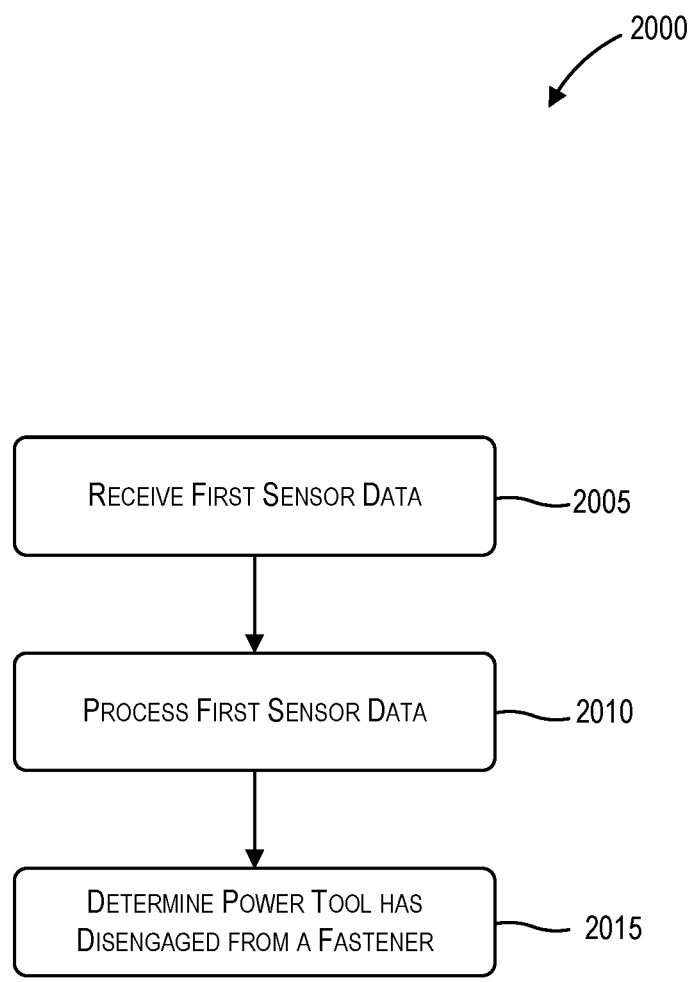
FIG. 20 is a flowchart illustrating a method of operating the power tool of FIG. 1.

FIG. 20 is a method 2000 of determining that a power tool 100 has disengaged from a fastener during a one-dimensional fastening application. In step 2005, the controller 200 receives first sensor data. For example, first sensor data may be data from the accelerometer and be indicative of acceleration vibrations of the power tool 100 when the user moves the power tool 100 backwards after a fastening event. In step 2010, the controller 200 processes the first sensor data. In some embodiments, the controller 200 may subtract gravitational acceleration from the first sensor data to provide resultant data and then perform a double integration on the resultant data to determine an estimate of the linear distance that the power tool 100 has been moved backwards. Alternatively or additionally, the controller 200 may subtract gravitational acceleration from the first sensor data to provide resultant data and then perform a single integration on the resultant data to determine an estimate of speed with which the power tool 100 was moved backwards. In some embodiments, the controller 200 assumes that the power tool 100 starts from rest. For example, given that the power tool 100 is assumed to stay stationary during a fastening event, rest may be when the power tool 100 is engaged with the fastener.

In step 2015, the controller 200 determines that the power tool 100 has disengaged from a fastener. In some embodiments, the controller 200 may compare the linear distance that the power tool 100 has been moved backwards to a minimum linear distance to determine that the power tool 100 has disengaged from a fastener. Alternatively, or additionally, the controller 200 may compare the speed with which the power tool 100 was retracted to a minimum speed to determine that the power tool 100 has disengaged from a fastener. In some embodiments, the controller 200 may determine that the power tool 100 has disengaged from a fastener based on a combination of distance moved backwards, speed with which the power tool 100 is moved backwards, and/or time elapsed.

Figure 21:
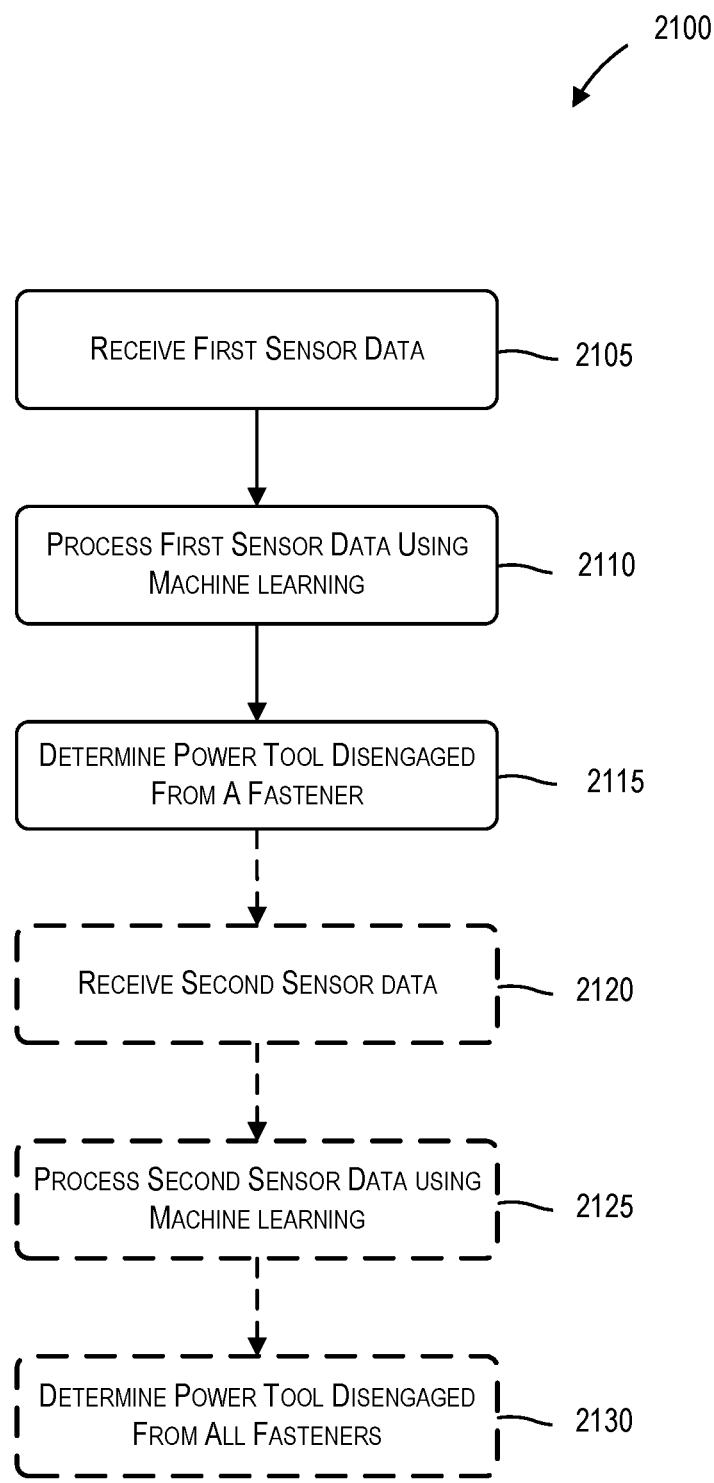
FIG. 21 is a flowchart illustrating a method of operating the power tool of FIG. 1.

A one-dimensional fastening application can also use machine learning to determine if a fastener was disengaged by a power tool 100. FIG. 21 is a method 2100 of determining that a power tool 100 has disengaged from a fastener using machine learning during a one-dimensional fastening application. In step 2105, the machine learning controller 252 receives first sensor data. For example, first sensor data may be data from the accelerometer and be indicative of acceleration vibrations of the power tool 100 when the user moves the power tool 100 backwards after a fastening event. In some embodiments, the machine learning controller 252 may subtract gravitational acceleration from the first sensor data prior to processing the first sensor data. For example, the machine learning controller 252 may approximate gravitational acceleration while the power tool 100 is at rest (e.g., while the power tool 100 is stationary during a fastening application). Alternatively, the machine learning controller 252 may account for gravitational acceleration while processing the first sensor data. In step 2110, the machine learning controller 252 processes the first sensor data. The machine learning controller 252 may use any one of a DNN, a CNN, a RNN, an attention network, a lambda network, a decision tree, a linear regression, a logistic regression, a SVM, a KNN, etc. to process the first sensor data. In step 2115, the machine learning controller 252 determines that the power tool 100 has been disengaged from a fastener based on the first sensor data that was processed using machine learning.

The machine learning controller 252 may be used to determine if a fastening application with multiple fasteners has been completed. In step 2120, the machine learning controller 252 receives second sensor data. For example, second sensor data may be data from the accelerometer and be indicative of acceleration vibrations of the power tool 100 at a second location in a fastening application. Alternatively, or additionally, second sensor data may be data indicative of the time it takes to perform a fastening application. In some embodiments, the second sensor data may be preliminarily processed by the machine learning controller 252. For example, gestures (e.g., moving back and forth between couplings, moving in a certain pattern to fasten each fastener of a lug nut pattern, etc.) with which the power tool 100 is moved in one dimension may be determined by the machine learning controller 252. In step 2125, the machine learning controller 252 processes the second sensor data. The machine learning controller 252 may use any one of a DNN, a CNN, a RNN, an attention network, a lambda network, a decision tree, a linear regression, a logistic regression, a SVM, a KNN, etc. to process the second sensor data. In step 2130, the machine learning controller determines that the power tool 100 has been disengaged from all of the fasteners in the fastening application.

In some embodiments, one-dimensional motion in a one-dimensional fastening application may be determined based on trigger pulls. For example, the time between fastening events may indicate that the user has disengaged the power tool 100 from a first fastener and engaged with a second fastener based on the time between trigger pulls. The one-dimensional change in position of the power tool 100 may be determined by the controller 200 and/or the machine learning controller 252 based on the time between fastening events. The time between fastening events may correspond to a particular one-dimensional movement between fasteners.

Multiple axis motion tracking is more complex than the single axis motion tracking described above. For example, as described above, the controller 200 of the power tool 100 may determine the status of an operation of the power tool 100 based on "dead reckoning." Dead reckoning uses the multi-axis data described using the coordinate system 905 to determine what operation the power tool 100 is being used for and what part of the operation the power tool 100 has completed (or is completing). Specifically, dead reckoning can be used to measure pure distances, relative displacements, displacements with respect to gravity, etc. Distance based dead reckoning works particularly well for applications such as coupling fasteners and lug nuts where the number and distance of the motions are limited.

However, in some embodiments, values outside of the distance/directional space, such as velocities or accelerations, can also be used. For example, dead reckoning can be used to derive general or overall movement of the power tool using the data from the coordinate system 905. In some embodiments, dead reckoning can be used to determine the speed of the movement of the power tool 100. Specifically, a minimum speed may be identified to determine that a first fastener has been fastened and that the user is moving to a second fastener in a fastening application. Additionally, monitoring an amount of time that elapses between power tool runs (e.g., actuations) provides an input for tracking multiple fastener operations.

In some instances of dead reckoning using purely raw data from sensors (e.g., accelerometer, gyroscope, magnetometer, etc.) processed by a controller (e.g., controller 200), the dead reckoning computation may be noisy (e.g., full of erroneous acceleration vibration readings). To remedy the instances of noise, raw sensor data may be fused and processed by the controller 200 to create vectors of estimated displacement. For example, the vectors of estimated displacement may correspond to a single transition from a first fastener to a second fastener, comparing a transition from a first fastener to a second fastener to a transition from the second fastener to a third fastener, or a transition of the power tool 100 that occurs not during the active fastening of a fastener. In some embodiments, the vector of estimated displacement formed in a fastening application including three subsequent lug nuts should be at least 30 degrees and less than 90 degrees. In order for the vectors of estimated displacement to be the most accurate, the user should hold the power tool 100 within 10 degrees of axial alignment between fastening events for an acceptable amount of drift. In some embodiments, the vectors of estimated displacement may create an array of motion input. In some embodiments, the array of motion input may be the raw data from sensors. The array of motion may be processed by the machine learning controller 252 to build confidence and knowledge about the fastening operation being done by the power tool 100.

Figure 22:
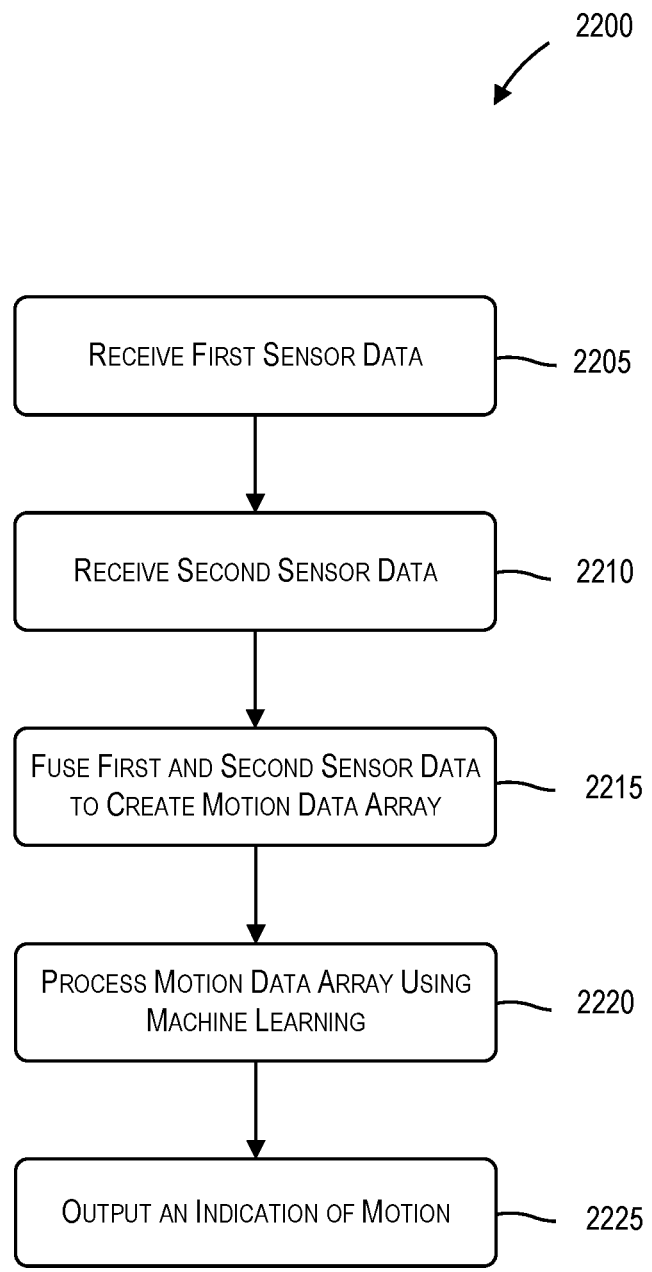
FIG. 22 is a flowchart illustrating a method of operating the power tool of FIG. 1.

FIG. 22 is a method 2200 of tracking multiple axis motion of a power tool 100 using machine learning. In step 2205, the controller 200 receives first sensor data. In some embodiments, the machine learning controller 252 may receive the first sensor data. For example, first sensor data may be data from the accelerometer and be indicative of acceleration vibrations of the power tool 100 during a transition from a first fastener to a second fastener. In step 2210, the controller 200 and/or the machine learning controller 252 receives second sensor data. For example, second sensor data may be data from the gyroscope and be indicative of the special orientation of the power tool 100. In general, the power tool 100 remains stationary during a fastening event such that sensor data is indicative of the power tool 100 being moved during a fastening application. In step 2215, the controller 200 and/or the machine learning controller 252 fuses the first sensor data and the second sensor data to create a motion data array. In some embodiments, the controller 200 and/or the machine learning controller 252 may process the first sensor data prior to fusing the data. For example, the controller 200 and/or the machine learning controller 252 may integrate the first sensor data twice to determine distance data. The controller 200 and/or the machine learning controller 252 may compensate for gravitational acceleration during the initial processing of the first sensor data. In step 2220, the machine learning controller 252 processes the motion data array. The machine learning controller 252 may use any one of a DNN, a CNN, a RNN, an attention network, a lambda network, a decision tree, a linear regression, a logistic regression, a SVM, a KNN, etc. to process the motion data array.

In step 2225, the machine learning controller 252 outputs an indication based on the machine learning processed motion data array. For example, the indication may be an estimated displacement of the power tool 100 during a fastening operation and/or an estimated motion parameter (e.g., a minimum speed reached to indicate that the power tool 100 transitioned from a first fastener to a second fastener). As another example, the indication may be a classification of confidence that a user disengaged the power tool 100 from a fastener, that a user transitioned the power tool 100 from a first fastener to a second fastener, and/or that a user engaged the power tool 100 with a next fastener. As a further example, the indication may be a classification that two subsequent transitions between fasteners were valid (e.g., for a coupling fastener application a user would move the power tool 100 right first after fastening a first fastener and the move left after fastening a second fastener). As a further example, the indication may be a classification of multiple transitions that result in a valid or particular lug nut pattern (e.g., a star lug nut pattern) or that indicates a next expected fastener in the particular lug nut pattern. In some embodiments, the estimated displacement of the power tool 100 may be further processed by the machine learning controller 252 to determine additional details about the fastening application.

The movement from one fastener to another is typically vibration free. For example, a user typically moves the power tool 100 from one fastener to another without making extraneous movements or encountering obstacles that may affect the data collected by the sensors of the power tool 100. However, in some scenarios the user may accidently bump a part of the power tool 100 (e.g., a socket) into the fasteners during the transition from one fastener to the next. This can create erroneous sensor data (e.g., noise) when implementing dead reckoning. In order to remedy this issue, machine learning may be used to crop and/or denoise raw motion data to determine when the power tool 100 is in free space. In some embodiments, when machine learning is used to process the motion data, an error threshold may be associated with each fastener such that if the raw motion is slightly off from what is expected, the machine learning controller 252 may account for that by "snapping" the processed motion data to the expected fastener. This can help to mitigate dead reckoning errors that may compound over time during a fastening application.

Figure 23:
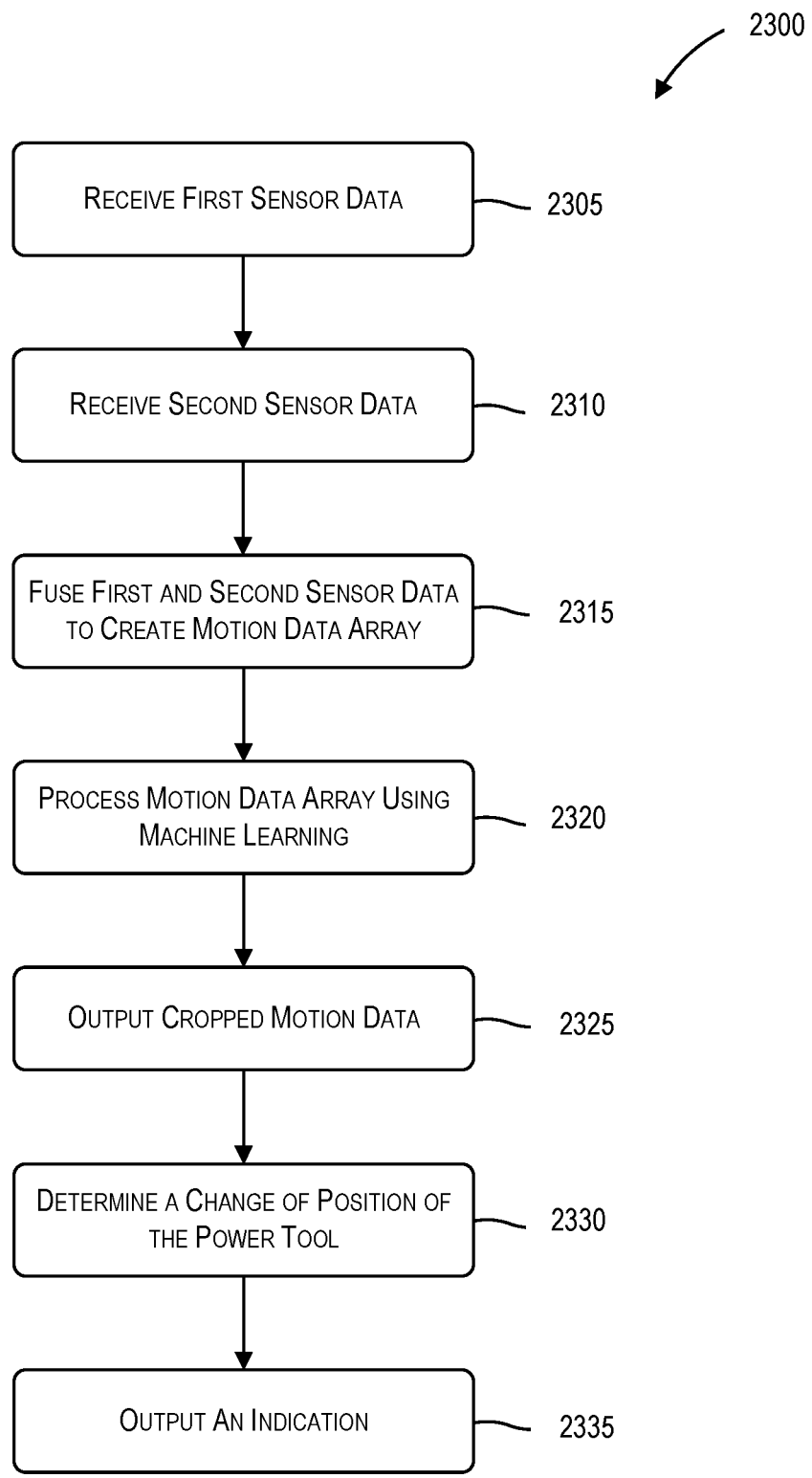
FIG. 23 is a flowchart illustrating a method of operating the power tool of FIG. 1.

FIG. 23 is a method 2300 of tracking multiple axis motion of a power tool 100 using machine learning to crop raw motion data. In step 2305, the controller 200 receives first sensor data. In some embodiments, the machine learning controller 252 may receive the first sensor data. For example, first sensor data may be data from the accelerometer and be indicative of acceleration vibrations of the power tool 100 during a transition from a first fastener to a second fastener. In step 2310, the controller 200 and/or the machine learning controller 252 receives second sensor data. For example, second sensor data may be data from the gyroscope and be indicative of the special orientation of the power tool 100. In general, the power tool 100 remains stationary while fastening a fastener such that sensor data is indicative of the power tool 100 being moved during a fastening application. In step 2315, the controller 200 and/or the machine learning controller 252 fuses the first sensor data and the second sensor data to create a motion data array.

In some embodiments, the controller 200 and/or the machine learning controller 252 may process the first sensor data prior to fusing the data. For example, the controller 200 and/or the machine learning controller 252 may integrate the first sensor data twice to determine distance data. The controller 200 and/or the machine learning controller 252 may compensate for gravitational acceleration during the initial processing of the first sensor data. In step 2320, the machine learning controller 252 processes the motion data array to create cropped motion data that corresponds to the power tool 100 being moved in free space. The machine learning controller 252 may use any one of a DNN, a CNN, a RNN, an attention network, a lambda network, a decision tree, a linear regression, a logistic regression, a SVM, a KNN, etc. to process the motion data array. In step 2325, the machine learning controller 252 outputs the cropped motion data. For example, the cropped motion data is cropped such that any erroneous data from the power tool 100 encountering an obstacle may not be taken into account when dead reckoning is used to determine that the fastening application has been complete.

In step 2330, the machine learning controller 252 determines a change of position of the power tool 100 based on the cropped motion data. In some embodiments, the controller 200 determines the change of position of the power tool 100. In step 2335, the machine learning controller 252 outputs an indication based on the determined change of position of the power tool 100. For example, the indication may be an estimated displacement of the power tool 100 during a fastening operation and/or an estimated motion parameter (e.g., a minimum speed reached to indicate that the power tool 100 transitioned from a first fastener to a second fastener). As another example, the indication may be a classification of confidence that a user disengaged the power tool 100 from a fastener, that a user transitioned the power tool 100 from a first fastener to a second fastener, and/or that a user engaged the power tool 100 with a next fastener. As a further example, the indication may be a classification that two subsequent transitions between fasteners were valid (e.g., for a coupling fastener application a user would move the power tool 100 right first after fastening a first fastener and the move left after fastening a second fastener). As a further example, the indication may be a classification of multiple transitions that result in a valid or particular lug nut pattern (e.g., a star lug nut pattern) or that indicates a next expected fastener in the particular lug nut pattern.

An additional technique for determining that a fastening application has been complete is determining the time duration between fastening events. Using time to determine that a fastening application has been complete does not require an inertial measurement unit (e.g., including an accelerometer, gyroscope, etc.). The time duration between fastening events may be used as an input to predict which fastener might be engaged next. For example, during a star lug nut pattern (e.g., FIG. 14B), the distances between the lug nuts are related to the duration (time) it takes a user to move the power tool 100 from one lug nut to the next. Therefore, the controller 200 could determine which lug nut was fastened and which lug is to be fastened next based on the amount of time the power tool 100 was moving. In some embodiments, the controller 200 may determine the time between fastening events, the time during the fastening events, the time between the starts of fastening events, etc.

Using time to determine that a fastening application is completed successfully requires reliable timing data between fastener events. Therefore, accidental trigger pulls need to be accounted for. In some embodiments, the power tool 100 may be prevented from operating for some minimum duration of time ($t_{wait}$) after a fastening event to prevent accidental second trigger pulls. In some embodiments, the user may not be constrained by a fixed $t_{wait}$. For example, the user interface may indicate a ready state for a user to begin a next fastening event (e.g., illuminating a work light fully, changing a color of the work light, displaying a message on the user interface, etc.). If the user begins the next fastening event prior to $t_{wait}$ occurring, the power tool 100 may notify the user that they began the next fastening event prematurely.

Figure 24:
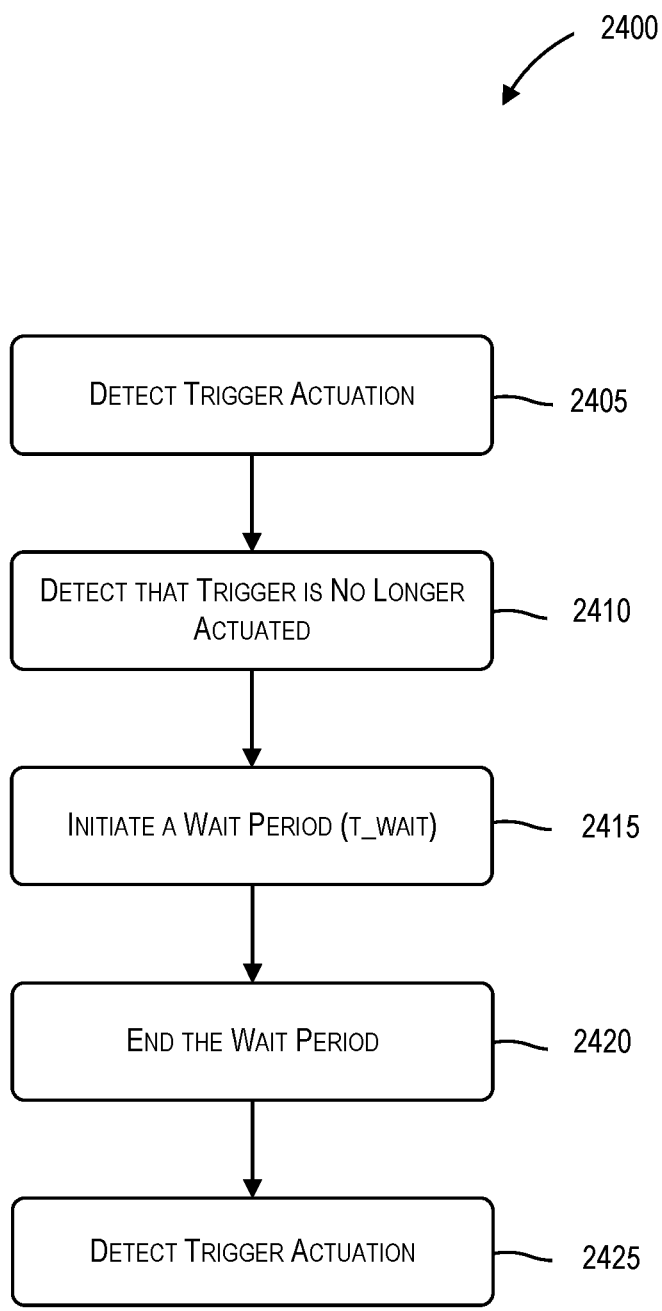
FIG. 24 is a flowchart illustrating a method of operating the power tool of FIG. 1.

FIG. 24 is a method 2400 of preventing accidental trigger pulls during a fastening application. In step 2405, the controller 200 detects that the trigger 110 has been actuated by a user. Upon actuation of the trigger 110, the power tool 100 fastens a fastener. In step 2410, the controller 200 detects that the trigger 110 is no longer actuated by a user. In step 2415, the controller 200 initiates a wait period ($t_{wait}$). For example, the wait period prohibits the power tool 100 from running, regardless of trigger 110 actuation by a user. In some embodiments, the wait period is between 0.1 seconds and 1 second. In some embodiments, the wait period may be initiated at the start of a first fastening event. In some embodiments, the wait period may be a function of the current state of the fastening application. For example, during a rundown pass the duration of the wait period may be greater as it takes a user time to place the next fastener in the correct position. In step 2420, the controller ends 200 the wait period. In step 2425, the controller 200 detects that the trigger 110 has been actuated by a user once again.

In some embodiments, the wait period ($t_{wait}$) may adapt to each user. For example, $t_{wait}$ may be stored as an adjustable parameter inside the power tool 100. As a user repeatedly uses the power tool 100, the time between fastening events may be recorded by the controller 200 and $t_{wait}$ may adapt (withing fixed bounds) based on the recorded times. For example, the controller 200 may use the following calculation to determine $t_{wait_{new}}$ adapted to a user:

$$t_{wait_{new}} = t_{wait_{old}} - 10 \text{ ms} \left( \text{if} - 100 \text{ ms} < t_{wait_{attempt}} - t_{wait_{old}} < 0 \text{ s} \right) \quad \text{EQN. 1}$$

$$t_{wait_{new}} = t_{wait_{old}} - 10 \text{ ms} \left( \text{if } 0 \text{ s} < t_{wait_{attempt}} - t_{wait_{old}} < 100 \text{ ms} \right) \quad \text{EQN. 2}$$

$t_{wait_{new}}$ is constrained to be between, for example, 0.5 seconds and 1 second.

The time between fastening events can be used to determine if the fasteners in a fastening application were fastened in the correct order. For example, in a star lug nut pattern (e.g., FIG. 14B) it is important that a user fastens the lug nuts in the correct order. The machine learning controller 252 may be able to determine that the lug nuts were fastened in the correct order based on the timing between fastening events. In some embodiments, the machine learning controller 252 may compare a time duration array of the times between fastening events to a model time duration array stored in the machine learning controller 252 for the fastening application that was performed to determine that the fastening application was performed correctly. In some embodiments, the machine learning controller 252 may compare the ratios of time durations between the fastening events to determine that the fastening application was performed correctly.

Figure 25:
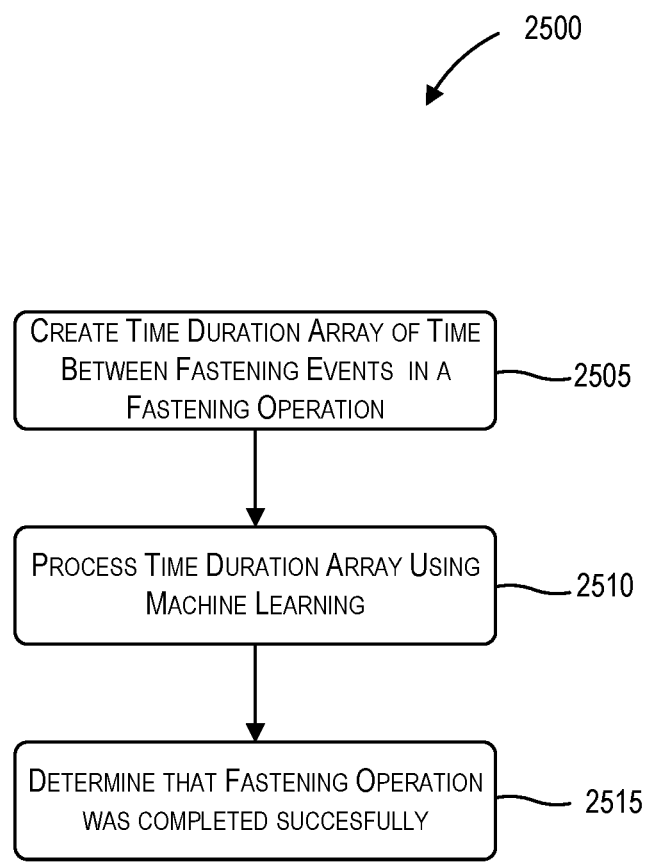
FIG. 25 is a flowchart illustrating a method of operating the power tool of FIG. 1.

FIG. 25 is a method 2500 of determining if a fastening application was performed correctly based on a time duration array. In step 2505, the machine learning controller 252 creates a time duration array for the times ($t_{w1}$, $t_{w2}$, $t_{w3}$, . . . ) between fastening events. In some embodiments, the time duration array may account for $t_{wait}$ between fastening events. In some embodiments, the time duration array may include the time duration of the fastening event. For example, the time duration array may include the time at which the power tool 100 is fastening a first fastener and a time between the fastening of the first fastener and the second fastener. In some embodiments, the machine learning controller 252 may be able to determine whether accidental trigger pulls occurred and therefore not include the accidental trigger pull as a fastening event.

In step 2510, the machine learning controller 252 processes the time duration array using machine learning. The machine learning controller 252 may use any one of a DNN, a CNN, an RNN, an attention network, a lambda network, a decision tree, a linear regression, a logistic regression, a SVM, a KNN, etc., to process the time duration array. In step 2515, the machine learning controller 252 determines that the fastening operation was completed successfully based on the processed time duration array. The fastening operation can be classified as a success if the user fastened the fasteners in the correct order, as determined by the machine learning controller 252. If the machine learning controller 252 determines that the fastening application was not successfully completed (e.g., the user fastened the fasteners in the wrong order, the user did not completely fasten the fasteners, etc.), then the user interface may display a warning. For example, the warning may be an error message or a work light being illuminated a certain color.

Although three primary techniques for tracking multiple fastener operations have been described herein in detail, other techniques can be similarly implemented to track multiple fastener applications. For example, the power tool 100 could include a camera and execute a simultaneous localization and mapping ("SLAM") algorithm or image recognition techniques. Further techniques include other tool and sensor data, such as motor current, motor speed, duration, total rotation, added energy, etc., to distinguish portions of a multiple fastener operation. Further techniques include using distance sensors (e.g., infrared, laser, etc.) with a target, or fixing the power tool to a robotic arm so the relative position of the power tool can be known throughout the process. Further techniques include using a single motion sensor in addition to a controller to describe the movement of the power tool 100. For example, an accelerometer can detect when a tool is running due to heavy vibration and thus a controller can determine the movement of the power tool 100 such as engagement, fastening, disengagement, position, and motion. The determine movement of the power tool 100 can be saved to the memory 225 of the controller 200 for future processing and reference.

A further technique for tracking multiple fastener operations includes using two controllers. A first controller (e.g., an integrated circuit) receives first sensor data (e.g., motion data) from a first sensor, such as sensor 250, and determines an aspect (e.g., engagement, disengagement, moving from one fastener to another, etc.) associated with the motion of the power tool 100 between fastening operations. The first controller communicates the aspect to a second controller. For example, the second controller may be a motor controller. The first and/or second controllers may directly and/or indirectly collaborate with other aspects of the power tool 100 (e.g., alerts, lights, logging, etc.).

A further technique for tracking multiple fastener operations includes using multiple power tools 100 in an assembly operation. A first controller of a first power tool and a second controller of a second power tool may be in communication with one another during a fastening operation. For example, during an assembly, multiple types of power tools (e.g., impact driver, staple gun, etc.) may be used simultaneously or serially during an assembly. Each power tool may determine an aspect (e.g., engagement, disengagement, moving from one fastener to another, etc.) associated with the motion of the respective power tool between fastening operations. The controllers of the power tools may communicate with one another to communicate a successful fastening operation. An assembly fastening operation may then only been deemed a success if each fastener was correctly installed by each power tool across the entire assembly. In some embodiments, a first power tool may be used during a first pass of a fastening operation (e.g., during a rundown pass to a first, initial low torque) and a second pass (e.g., a powered digital torque wrench) to complete the passes of the fastener of the fastening operation.

A further technique for tracking fastener operations during an assembly operation may include a power tool 100 interacting with an illumination device (e.g., a work light, a laser, etc.). The illumination device may illuminate based on a determined aspect (e.g., engagement, disengagement, moving from one fastener to another, etc.) associated with the motion of the respective power tool. For example, during an assembly operation the power tool 100 may communicate with the illumination device to illuminate when the power tool 100 moves from a first fastener to a second fastener. As another example, the illumination level of the illumination device may be adjusted based on the fastening operation.

Thus, embodiments described herein provide, among other things, systems and methods of determining the completion of a power tool operation. Various features and advantages are set forth in the following claims.

What is claimed is:

1. A power tool comprising:
    a housing;
    a motor supported by the housing;
    a first sensor configured to generate first sensor data related to a movement of the power tool; and
    a controller within the housing and connected to the motor, the controller configured to:
        receive the first sensor data from the first sensor between a first operation and a second operation of the power tool, wherein the first sensor data is related to the movement of the power tool,
        determine a change in position of the power tool based on the first sensor data,
        determine that the second operation of the power tool is complete based on the change in position of the power tool, and
        output an indication to a user interface to alert a user that the second operation was completed.

2. The power tool of claim 1, wherein, to determine the change in position of the power tool, the controller is configured to integrate the first sensor data.

3. The power tool of claim 1, wherein:
    the first operation is a coupling operation at a first fastener; and
    the second operation is the coupling operation at a second fastener.

4. The power tool of claim 1, wherein completion of the second operation indicates the completion of a coupling operation.

5. The power tool of claim 1, further comprising:
a second sensor configured to generate second sensor data indicative of the first operation of the power tool, and wherein the controller is further configured to:
receive the second sensor data indicative of beginning the first operation of the power tool.

6. The power tool of claim 5, wherein the first sensor is an accelerometer and the second sensor is a trigger sensor.

7. The power tool of claim 1, further comprising a third sensor configured to generated third sensor data.

8. The power tool of claim 7, wherein the third sensor is a gyroscope.

9. The power tool of claim 7, further comprising a fourth sensor configured to generate fourth sensor data.

10. The power tool of claim 9, wherein the fourth sensor is a magnetometer.

11. A method of determining that a power tool fastening operation has been completed, the method comprising:
receiving first sensor data from a first sensor between a first operation and a second operation of a power tool, wherein the first sensor data is related to a movement of the power tool;
determining a change in position of the power tool based on the first sensor data;
determining, based on a characteristic of the change in position, a stored operation profile;
determining that the power tool fastening operation is complete based on the stored operation profile; and
outputting an indication to a user interface to alert a user that the power tool fastening operation was completed.

12. The method of claim 11, wherein the stored operation profile corresponds to one of a coupling operation, a lug nut fastening operation, and a flange fastening operation.

13. The method of claim 11 further comprising:
receiving second sensor data from a second sensor, wherein the second sensor data is indicative of a motor parameter of a motor of the power tool; and
controlling the motor based on at least one of the stored operation profile and the second sensor data.

14. The method of claim 11, wherein the first operation is spatially different than the second operation.

15. The method of claim 11, wherein the first operation is spatially the same as the second operation.

16. The method of claim 11, wherein the power tool fastening operation is a first fastening operation, and the method further comprises:
receiving second sensor data from the first sensor between the second operation of the power tool and a third operation of the power tool;
determining that the second operation is complete based on the stored operation profile; and
outputting a second indication to the user interface to alert the user that the second fastening operation was completed, wherein completion of the second fastening operation indicates completion of the operation profile.

17. A system comprising:
a fastener; and
a power tool comprising:
a housing,
a motor supported by the housing,
a first sensor configured to generate first sensor data related to a movement of the power tool, and
a controller within the housing and connected to the motor, the controller configured to:
receive the first sensor data from the first sensor related to the movement of the power tool,
determine a change in position of the power tool based the first sensor data,
determine that a first operation of the power tool is complete based on at least one of the change in position of the power tool and a stored operation profile, and
output an indication to a user interface to alert a user that the first operation was completed.

18. The system of claim 17, wherein the controller is further configured to:
receive second sensor data from a second sensor related to a movement of the fastener, wherein the fastener is provided on a work piece;
determine the relative change in position between the power tool and the work piece based on at least one of the first sensor data and the second sensor data;
determine that each portion of the stored operation profile is complete based on the relative change in position between the power tool and the work piece; and
output an indication to the user interface to alert the user that the stored operation profile was completed.

19. The system of claim 18, wherein the first sensor and the second sensor are each accelerometers.

20. The system of claim 17, wherein the controller is further configured to control the motor based on the stored operation profile.

* * * * *